United States Patent
Vaze

(10) Patent No.: US 11,079,882 B2
(45) Date of Patent: Aug. 3, 2021

(54) DIAMOND BASED TOUCH SENSOR PANEL ARCHITECTURES

(71) Applicant: Apple Inc., Cupertino, CA (US)

(72) Inventor: Sagar Rajiv Vaze, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/551,698

(22) Filed: Aug. 26, 2019

(65) Prior Publication Data

US 2020/0103994 A1 Apr. 2, 2020

Related U.S. Application Data

(60) Provisional application No. 62/738,917, filed on Sep. 28, 2018.

(51) Int. Cl.
*G06F 3/044* (2006.01)
*G06F 1/16* (2006.01)
*G06F 3/045* (2006.01)

(52) U.S. Cl.
CPC ............... *G06F 3/044* (2013.01); *G06F 1/16* (2013.01); *G06F 3/045* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |

(Continued)

FOREIGN PATENT DOCUMENTS

| | | |
|---|---|---|
| CN | 106951125 A | 7/2017 |
| EP | 2660688 A1 | 11/2013 |

(Continued)

OTHER PUBLICATIONS

International Preliminary Report on Patentability received for PCT Patent Application No. PCT/US2018/000253, dated Feb. 27, 2020, 15 pages.

(Continued)

*Primary Examiner* — Deeprose Subedi

(74) *Attorney, Agent, or Firm* — Kubota & Basol LLP

(57) ABSTRACT

A touch sensor panel including a first set of touch electrodes configured to operate as drive electrodes and a second set of touch electrodes configured to operate as sense electrodes. The first set of touch electrodes being disposed within gaps between the second set of touch electrodes, and a given row or column of touch electrodes of the second set of touch electrodes includes a plurality of subsets of touch electrodes that are separately addressable by touch sensing circuitry.

24 Claims, 16 Drawing Sheets

(56) References Cited

U.S. PATENT DOCUMENTS

| | | | |
|---|---|---|---|
| 7,932,897 | B2 | 4/2011 | Elias et al. |
| 8,479,122 | B2 | 7/2013 | Hotelling et al. |
| 8,593,410 | B2 | 11/2013 | Hong et al. |
| 8,754,662 | B1 | 6/2014 | Weng et al. |
| 9,075,484 | B2 | 7/2015 | Ritter et al. |
| 9,182,865 | B2 | 11/2015 | Chae |
| 9,261,997 | B2 | 2/2016 | Chang et al. |
| 9,304,641 | B2 | 4/2016 | Kang et al. |
| 9,417,747 | B2 | 8/2016 | Yumoto et al. |
| 9,575,610 | B2 | 2/2017 | Hotelling et al. |
| 9,582,099 | B2 | 2/2017 | Small |
| 9,626,049 | B2 | 4/2017 | Chandran et al. |
| 9,886,141 | B2 | 2/2018 | Yousefpor |
| 9,983,738 | B2 | 5/2018 | Wang et al. |
| 10,429,981 | B2 | 10/2019 | Noguchi et al. |
| 2006/0197753 | A1 | 9/2006 | Hotelling |
| 2008/0297174 | A1 | 12/2008 | Narasimhan et al. |
| 2008/0309633 | A1 | 12/2008 | Hotelling et al. |
| 2010/0026660 | A1 | 2/2010 | Kitamura |
| 2010/0110038 | A1 | 5/2010 | Mo et al. |
| 2010/0265188 | A1 | 10/2010 | Chang et al. |
| 2010/0315374 | A1* | 12/2010 | Chen ............ G06F 3/044 345/174 |
| 2012/0050216 | A1 | 3/2012 | Kremin et al. |
| 2013/0100071 | A1 | 4/2013 | Wright et al. |
| 2013/0154996 | A1 | 6/2013 | Trend et al. |
| 2013/0181949 | A1 | 7/2013 | Setlak |
| 2013/0257786 | A1 | 10/2013 | Brown et al. |
| 2013/0307823 | A1 | 11/2013 | Grivna et al. |
| 2014/0184552 | A1 | 7/2014 | Tanemura |
| 2014/0210743 | A1 | 7/2014 | Kurasawa et al. |
| 2014/0253499 | A1 | 9/2014 | Lee et al. |
| 2014/0327644 | A1 | 11/2014 | Mohindra |
| 2015/0022494 | A1 | 1/2015 | Azumi et al. |
| 2015/0035787 | A1 | 2/2015 | Shahparnia et al. |
| 2015/0049043 | A1* | 2/2015 | Yousefpor ............ G06F 3/044 345/174 |
| 2015/0062062 | A1 | 3/2015 | Han et al. |
| 2015/0130742 | A1 | 5/2015 | Chen et al. |
| 2015/0205405 | A1 | 7/2015 | Yumoto et al. |
| 2015/0248183 | A1 | 9/2015 | Schwartz et al. |
| 2015/0261377 | A1 | 9/2015 | Reynolds et al. |
| 2015/0331535 | A1 | 11/2015 | Li et al. |
| 2016/0188039 | A1 | 6/2016 | Yoon et al. |
| 2016/0209962 | A1 | 7/2016 | Nurmi |
| 2016/0306458 | A1 | 10/2016 | Hong et al. |
| 2016/0306466 | A1 | 10/2016 | Gotoh et al. |
| 2016/0328079 | A1 | 11/2016 | Schwartz et al. |
| 2017/0024033 | A1 | 1/2017 | Chandran et al. |
| 2017/0228065 | A1 | 8/2017 | Lee et al. |
| 2017/0228073 | A1 | 8/2017 | Hagihara |
| 2017/0277328 | A1 | 9/2017 | Kurasawa et al. |
| 2018/0059862 | A1 | 3/2018 | Zeng et al. |
| 2018/0151627 | A1 | 5/2018 | Seo et al. |
| 2018/0157354 | A1 | 6/2018 | Blondin et al. |
| 2019/0056834 | A1 | 2/2019 | Blondin et al. |
| 2019/0102010 | A1 | 4/2019 | Knabenshue et al. |
| 2020/0004294 | A1* | 1/2020 | Tan ................ G06F 1/1626 |
| 2020/0371636 | A1 | 11/2020 | Blondin et al. |

FOREIGN PATENT DOCUMENTS

| | | |
|---|---|---|
| EP | 2930597 A2 | 10/2015 |
| EP | 2937767 A1 | 10/2015 |
| JP | 2000-163031 A | 6/2000 |
| JP | 2002-342033 A | 11/2002 |
| WO | 2015/183461 A1 | 12/2015 |
| WO | 2017/020344 A1 | 2/2017 |
| WO | 2017/058413 A1 | 4/2017 |
| WO | 2017/124310 A1 | 7/2017 |
| WO | 2019/035978 A2 | 2/2019 |

OTHER PUBLICATIONS

International Search Report and Written Opinion received for PCT Patent Application No. PCT/US2018/000253, dated Feb. 20, 2019, 19 pages.

International Search Report and Written Opinion received for PCT Patent Application No. PCT/US2018/053605, dated Mar. 19, 2019, 19 pages.

Lee et al., "A Multi-Touch Three Dimensional Touch-Sensitive Tablet", CHI'85 Proceedings, Apr. 1985, pp. 21-25.

Non-Final Office Action received for U.S. Appl. No. 15/998,425, dated Nov. 19, 2019, 52 pages.

Restriction Requirement received for U.S. Appl. No. 16/146,675, dated Jan. 10, 2020, 5 pages.

Rubine, Dean H., "Combining Gestures and Direct Manipulation", CHI'92, May 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Notice of Allowance received for U.S. Appl. No. 15/998,425, dated Apr. 3, 2020, 17 pages.

Corrected Notice of Allowability received for U.S. Appl. No. 15/998,425, dated May 26, 2020, 2 pages.

Non-Final Office Action received for U.S. Appl. No. 16/146,675, dated May 15, 2020, 22 pages.

Final Office Action received for U.S. Appl. No. 16/146,675, dated Dec. 24, 2020, 25 pages.

International Search Report received for PCT Patent Application No. PCT/US2019/048210, dated Dec. 10, 2019, 6 pages.

* cited by examiner

DIAMOND BASED TOUCH SENSOR PANEL ARCHITECTURES

CROSS REFERENCE TO RELATED APPLICATIONS

This application claims benefit of U.S. Provisional Patent Application No. 62/738,917, filed Sep. 28, 2018, the entire disclosure of which is incorporated herein by reference for all purposes.

FIELD OF THE DISCLOSURE

This relates generally to touch sensor panels, and more particularly, to touch sensor panels with diamond-shaped touch electrode configurations.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display, or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus, or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials, including conductive polymers, metal mesh, graphene, nanowires (e.g., silver nanowires), or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

In some examples, sensing the mutual capacitance of touch electrodes arranged in rows and columns can determine the location of a touch on the touch sensor panel with relatively high precision, but may have trouble detecting objects (e.g., fingers) further away from the touch sensor panel (e.g., hovering over the touch sensor panel). In some examples, sensing the self-capacitance of touch electrodes can effectively detect the locations of one or more objects (e.g., fingers) hovering over and/or touching the touch sensor panels, but touch electrode configurations for use in self-capacitance sensing can require a large number of touch electrodes and routing traces. Therefore, it can be beneficial to combine mutual capacitance and self-capacitance sensing of touch electrodes in a single touch sensor panel. The examples of the disclosure provide various touch sensing system configurations that combine mutual capacitance and self-capacitance sensing of diamond-shaped touch electrodes (e.g., touch electrodes having diamond shapes). Doing so can help can improve the touch sensing performance of the system while improving optical uniformity, reducing the number of electrodes and corresponding routing traces, and can help to decrease and optimize cost and facilitate system integration.

DETAILED DESCRIPTION

Figure 1A:
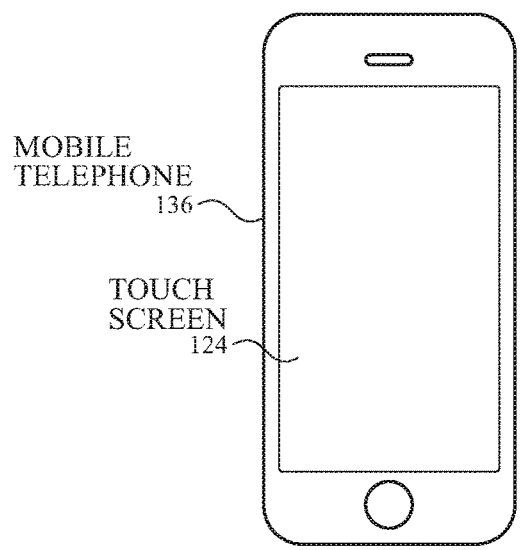
FIGS. 1A-1D illustrate an example mobile telephone, an example media player, an example personal computer, and an example tablet computer that can each include an exemplary touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Described here are capacitive touch sensor panels. Generally, the touch sensor panels comprise a plurality of plates formed from a conductive material; these plates are referred to herein as "touch electrodes." The touch electrodes may be made from any suitable conductive material (e.g., a transparent conductive oxide such as ITO or aluminum zinc oxide, a metal such as copper, a metal mesh material comprising a conductive cross-hatched metal structure with gaps between cross-hatched metal lines, carbon nanotube material, or any other suitable conductive material), which may be substantially transparent or non-transparent, depending on the application. In some instances where the touch electrodes are substantially transparent, the touch sensor panel may be placed on or otherwise integrated into a display (e.g., the touch electrodes may be placed within the display stack and/or may be utilized during the operation of the display to provide display functionality) to provide a touch sensitive display.

During operation of the touch sensor panels described here, a given touch electrode or plurality of electrodes may be configured to operate in a mutual capacitance touch sensing mode or a self-capacitance touch sensing mode. It should be appreciated that a given electrode may be used to perform mutual capacitance touch sensing at one point in time and self-capacitance touch sensing at a different point in time (e.g., by reconfiguring the touch sensor circuitry used to operate the touch electrode, or connecting the touch electrode to different touch sensor circuitry). For example, to perform mutual capacitance touch sensing, a given touch electrode can be stimulated with an AC waveform (e.g., the "drive electrode") and the mutual capacitance between that electrode and another touch electrode can be sensed at the other electrode (e.g., the "sense electrode"). To facilitate mutual capacitance sensing, a touch sensor panel may utilize an architecture in which a plurality of diamond-shaped touch electrodes (e.g., touch electrodes having diamond shapes) are arranged to form rows and a plurality of diamond-shaped touch electrodes are arranged to form columns, each row and column comprising a respective plurality of diamond-shaped electrodes, where a mutual capacitance may be measured at an overlap or adjacency of a row and a column, according to embodiments of the disclosure. Mutual capacitance sensing can determine the location of a touch on the touch sensor panel with relatively high precision, but may have trouble detecting objects (e.g., fingers) further away from the touch sensor panel (e.g., hovering over the touch sensor panel).

Conversely, the self-capacitance of a given touch electrode can be sensed by stimulating the touch electrode with an AC waveform, and measuring the self-capacitance to ground of that same touch electrode. When one or more electrodes of a touch sensor panel are operated in a self-capacitance sensing mode, the electrodes can effectively detect the locations of one or more objects (e.g., fingers) hovering over and/or touching the touch sensor panels. Generally, touch panels optimized for self-capacitance utilize a matrix architecture in which electrodes are arranged in a two-dimensional array to form rows and columns, each row and column comprising a respective plurality of electrodes. The individual electrodes are approximately the same size (although it should be appreciated that some electrodes may be larger or smaller to accommodate routing traces or to balance the bandwidth of individual electrodes). Depending on the size of the panel and the pitch/size of individual electrodes, a matrix architecture of self-capacitance touch electrodes can require a large number of self-capacitance touch electrodes and corresponding routing traces. There may also be many gaps without conductive material (e.g., areas without electrodes or traces) that can create optical inconsistencies. Therefore, it can be beneficial to closely arrange diamond-shaped touch electrodes in a single touch sensor panel. The examples of the disclosure provide various touch sensing system configurations that can perform mutual capacitance and self-capacitance sensing using these diamond-shaped electrodes. Doing so can help can improve the touch sensing performance of the system while improving optical uniformity and reducing the number of electrodes and corresponding routing traces. It is understood that as described in this disclosure, a "self-capacitance electrode" can be a touch electrode that is being operated in a self-capacitance sensing mode (which can at a later time be operated in a mutual capacitance sensing mode), and a "mutual capacitance electrode" can be a touch electrode that is being operated in a mutual capacitance sensing mode (which can at a later time be operated in a self-capacitance sensing mode). It should be understood that the electrodes described in this disclosure can vary in shape (e.g., can be squares, rectangles, polygons, circles, or any other polynomial shape) and/or size, as described below with reference to FIGS. 9A-9B, while maintaining other characteristics as described herein.

Figure 1B:
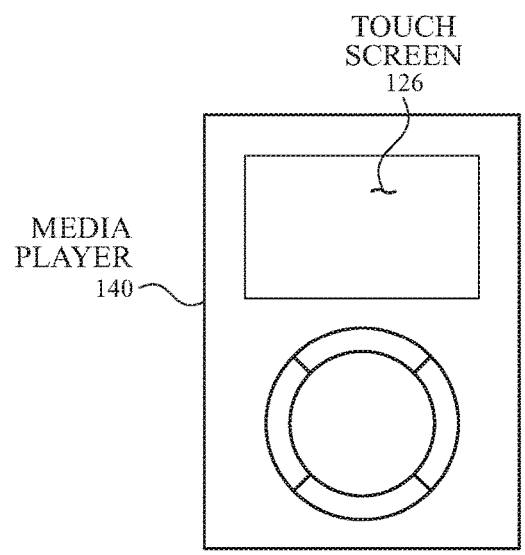
Figure 1C:
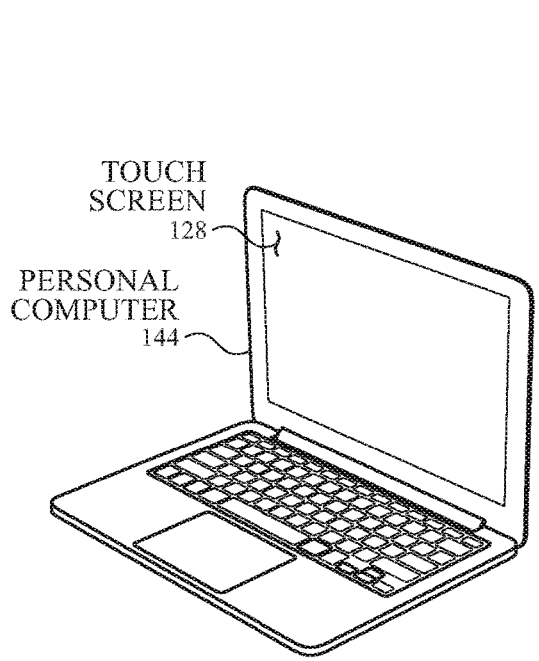
Figure 1D:
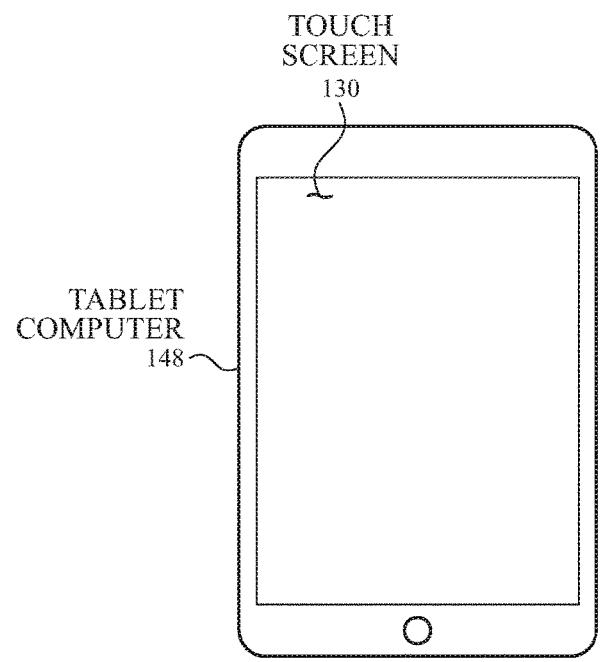

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128, and 130 can be configured and optimized to operate using a combination of self-capacitance and mutual-capacitance sensing. A self-capacitance and mutual capacitance hybrid touch system can include a matrix of small, individual diamond-shaped plates of conductive material that can be referred to as touch electrodes. The touch electrodes can be operated in various combinations of mutual and self-capacitance sensing modes, as will be described in more detail below.

A self-capacitance and mutual capacitance hybrid touch screen can include a plurality of individual diamond-shaped touch electrodes, each touch electrode (or group of touch electrodes) identifying or representing a unique location on the touch screen at which touch or proximity (i.e., a touch or proximity event) is to be sensed, and each touch electrode (or group of touch electrodes) being electrically isolated from other touch electrodes in the touch screen/panel. The touch electrodes can be on the same or different material layers on touch sensor panel. It is understood that in some examples, the touch electrodes on the touch screen can be operated in a self-capacitance sensing mode in which their self-capacitance is sensed, and in some examples can be operated in a mutual capacitance mode in which the same touch electrodes can be used to perform mutual capacitance scans on the touch screen (e.g., in combination with or instead of self-capacitance scans). During self-capacitance operation, a touch electrode can be stimulated with an AC waveform, and the self-capacitance to ground of the touch electrode can be measured. As an object approaches the touch electrode, the self-capacitance to ground of the touch electrode can change. This change in the self-capacitance of the touch electrode can be detected and measured by the touch sensing system to determine the positions of multiple objects when they touch, or come in proximity to, the touch screen. In some examples, a touch screen can be multi-touch, single touch, projection scan, full-imaging multi-touch, capacitive touch, etc. During mutual capacitance operation, the electrodes arranged in rows can be operated as drive electrodes, and the electrodes arranged in columns can be operated as sense electrodes (or vice versa), which can form mutual capacitance touch nodes at the intersections (or adjacent locations) of the drive and sense electrodes. The electrodes arranged in rows and electrodes arranged in columns can be on the same or different material layers on the touch screen. In some examples, the drive circuitry used to drive the drive electrodes and the sense circuitry used to sense the sense electrodes can be fixed, or can be variable such that the drive and sense designations of the row and column electrodes, respectively, can be switched during touch screen operation (e.g., the electrodes arranged in rows can become sense electrodes, and the electrodes arranged in columns can become drive electrodes). It is understood that the row and column arrangements of the above electrodes are not necessarily tied to any specific orientation of the device with which the touch screen is integrated, and that such arrangements can be relative to any suitable reference point.

During mutual capacitance operation, the drive electrodes can be stimulated with an AC waveform (e.g., the same or different AC waveform that stimulates the touch electrodes described previously in the self-capacitance configuration) and the mutual capacitance of the mutual capacitance touch nodes can be measured via the sense electrodes. As an object approaches the touch node, the mutual capacitance of the mutual capacitance touch node can change. This change in the mutual capacitance of the touch node can be detected and measured by the touch sensing system to determine the positions of multiple objects when they touch, or come in proximity to, the touch screen. It is understood that in some examples, the electrodes arranged as rows and columns on the touch screen can be used to perform scans other than mutual capacitance scans of the touch screen (e.g., self-capacitance scans in combination with or instead of the mutual capacitance scans).

Figure 2:
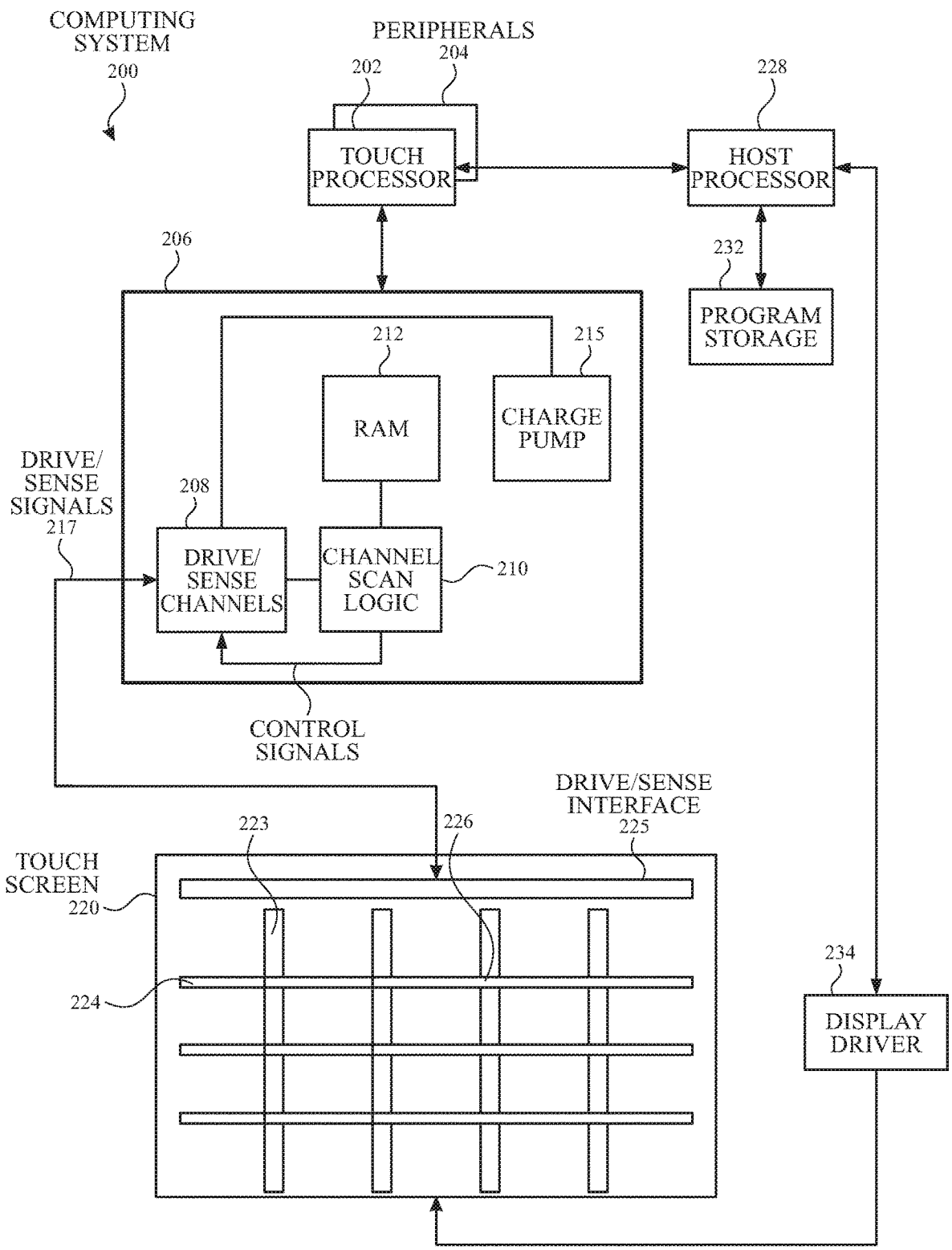
FIG. 2 is a block diagram of an example computing system that illustrates one implementation of an example self-capacitance and mutual capacitance hybrid touch screen according to examples of the disclosure.

FIG. 2 is a block diagram of an example computing system 200 that illustrates one implementation of an example self-capacitance and mutual capacitance hybrid touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch driving and/or sensing circuitry (described in more detail below). Peripherals 204 can include, but are not limited to, random access memory (RAM) or other types of memory or storage, watchdog timers, and the like. Touch controller 206 can include, but is not limited to, one or more drive/sense channels 208 and channel scan logic 210. Channel scan logic 210 can access RAM 212, autonomously read data from drive/sense channels 208, and provide control for the drive/sense channels. In addition, channel scan logic 210 can control drive/sense channels 208 to generate stimulation signals at various frequencies and phases that can be selectively applied to the touch electrodes and/or row and column electrodes of touch screen 220, as described in more detail below. In some examples, touch controller 206, touch processor 202, and peripherals 204 can be integrated into a single application-specific integrated circuit (ASIC), and in some examples can be integrated with touch screen 220 itself.

Touch screen 220 can include touch sensing circuitry that can include a capacitive sensing medium having a plurality of touch electrodes 223 and 224. It should be understood that the configuration of touch electrodes 223 and 224 can represent a logical layout. For example, column electrodes 223 and/or row electrodes 224 can represent collections of individual electrodes arranged as rows and/or column, respectively (e.g., as described in greater detail below). In other examples, column electrodes 223 and/or row electrodes 224 can represent a plurality of elongated touch electrodes disposed as rows and a plurality of elongated touch electrodes disposed as columns, respectively. In a mutual capacitance mode, the intersection of touch electrodes 223 and 224 can form mutual capacitance touch nodes 226, as discussed above. In a self-capacitance mode, touch electrodes 223 and/or 224 can be coupled to sense channels 208 in touch controller 206, can be driven by stimulation signals from the sense channels through drive/sense interface 225, and can be sensed for self-capacitance by the sense channels through the drive/sense interface as well, as described above. Similarly, in a mutual capacitance mode, touch electrodes 223 can be coupled to drive channels 208 in touch controller 206, and can be driven by stimulation signals from the drive channels through drive/sense interface 225, and touch electrodes 224 can be sensed by the sense channels through the drive/sense interface as well, as described above. Labeling the locations used to detect touch (e.g., a self-capacitance touch node electrode or a mutual capacitance touch nodes 226) as "touch nodes" can be particularly useful when touch screen 220 is viewed as capturing an "image" of touch (e.g., a "touch image"). In other words, after touch controller 206 has determined an amount of touch detected at each self-capacitance touch node electrode and/or mutual capacitance touch node 226 in touch screen 220, the pattern of touch nodes or touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as a display driver 234 (e.g., for controlling operation of a display, such as an LCD display, an OLED display, etc.). The display driver 234 can provide voltages on select (e.g., gate) lines to each pixel transistor and can provide data signals along data lines to these same transistors to control the pixel display image, as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, and missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Figure 3:
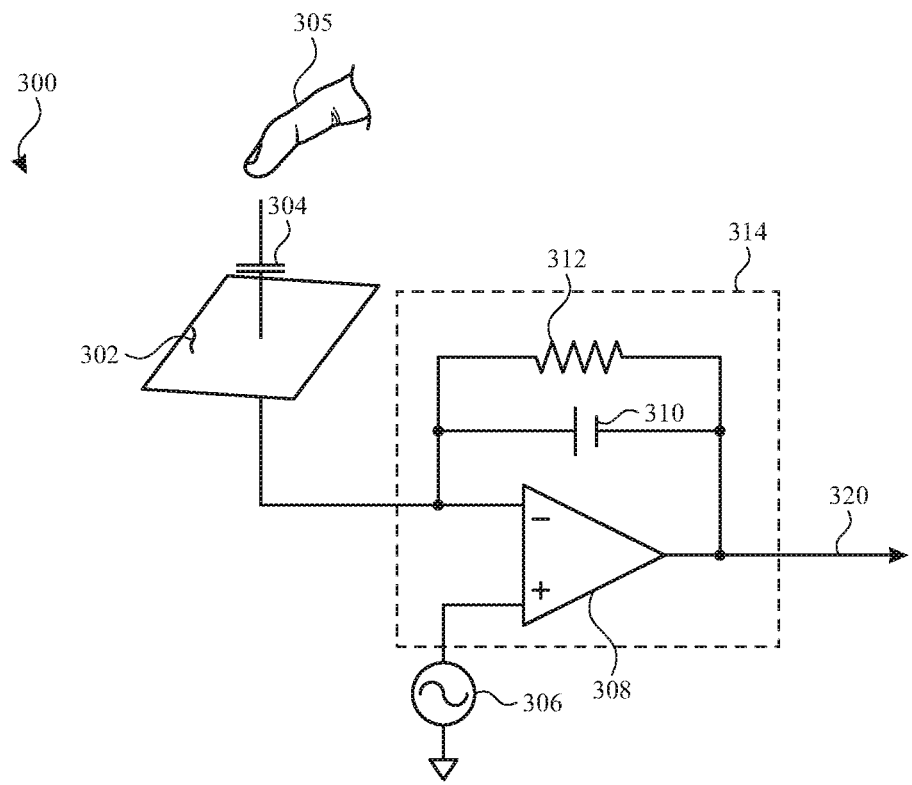
FIG. 3 illustrates an exemplary touch sensor circuit for performing a self-capacitance measurement using an electrode and sensing circuit according to examples of the disclosure.

FIG. 3 illustrates an exemplary touch sensor circuit 300 for performing a self-capacitance measurement using an electrode (e.g., a self-capacitance touch electrode 302) and sensing circuit 314 according to examples of the disclosure. Sensing circuit 314 can be included in sense channels 208 to sense the self-capacitance of one or more touch electrodes on the touch sensor panels/touch screens of the disclosure. Touch electrode 302 can correspond to any of touch electrode 223 or 224. Touch electrode 302 can have an inherent self-capacitance to ground associated with it, and also an additional self-capacitance to ground that is formed when an object, such as finger 305, is in proximity to or touching the electrode. The total self-capacitance to ground of touch electrode 302 can be illustrated as capacitance 304. Touch electrode 302 can be coupled to sensing circuit 314. Sensing circuit 314 can include an operational amplifier 308, feedback resistor 312, and feedback capacitor 310, although other configurations can be employed. For example, feedback resistor 312 can be replaced by a switched capacitor resistor in order to minimize a parasitic capacitance effect that can be caused by a variable feedback resistor. Touch electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 4:
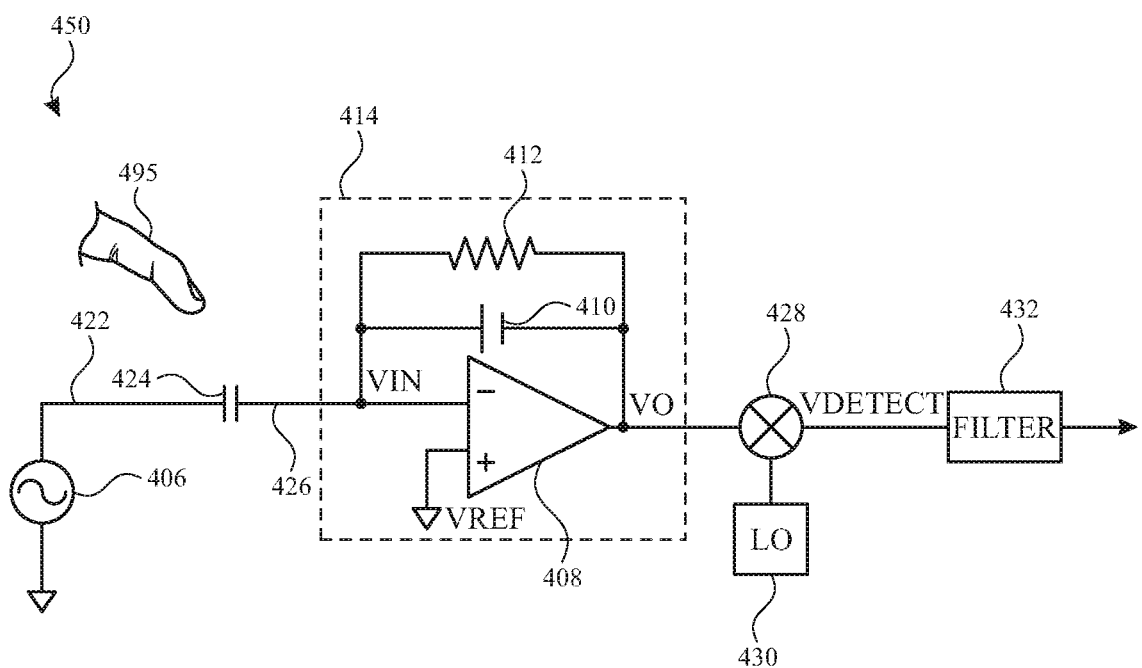
FIG. 4 illustrates an exemplary touch sensor circuit for performing a mutual capacitance measurement using two electrodes and sensing circuit according to examples of the disclosure.

FIG. 4 illustrates an exemplary touch sensor circuit 450 for performing a mutual capacitance measurement using two electrodes (touch electrode 422 operated as a mutual capacitance drive electrode and touch electrode 426 operated as a sense electrode) and sensing circuit 414 according to examples of the disclosure. Stimulation signal 406 can be generated by drive channels 208 (e.g., drive channels 208 can include an AC stimulation source 406), drive electrode 422 can correspond to column electrode 223, sense electrode 426 can correspond to row electrode 224, and sensing circuit 414 can be included in sense channels 208. Drive electrode 422 can be stimulated by stimulation signal 406 (e.g., an AC voltage signal). Stimulation signal 406 can be capacitively coupled to sense electrode 426 through mutual capacitance 424 between drive electrode 422 and sense electrode 426. When a finger or object 405 approaches the touch node created by the intersection of drive electrode 422 and sense electrode 426, mutual capacitance 424 can be altered. The intersection of drive electrode 422 and sense electrode 426 can correspond to mutual capacitance touch nodes 226. This change in mutual capacitance 424 can be detected to indicate a touch or proximity event at the touch node, as described previously and below. The sense signal coupled onto sense electrode 426 can be received by sensing circuit 414. Sensing circuit 414 can include operational amplifier 408 and at least one of a feedback resistor 412 and a feedback capacitor 410. FIG. 4 illustrates a general case in which both resistive and capacitive feedback elements are utilized. The sense signal (referred to as Vin) can be inputted into the inverting input of operational amplifier 408, and the non-inverting input of the operational amplifier can be coupled to a reference voltage Vref. Operational amplifier 408 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 414 can be mostly a function of the ratio of mutual capacitance 424 and the feedback impedance, comprised of resistor 412 and/or capacitor 410. The output of sensing circuit 414 Vo can be filtered and heterodyned or homodyned by being fed into multiplier 428, where Vo can be multiplied with local oscillator 430 to produce Vdetect. Vdetect can be inputted into filter 432. One skilled in the art will recognize that the placement of filter 432 can be varied; thus, the filter can be placed after multiplier 428, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode, and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

As previously mentioned, it can be beneficial to combine mutual capacitance and self-capacitance sensing of touch electrodes in a single touch sensor panel. Specifically, in some examples, mutual capacitance sensing of row and column electrodes can determine the location of a touch on the touch sensor panel with relatively high precision, but may have trouble detecting objects (e.g., fingers) further away from the touch sensor panel (e.g., hovering over the touch sensor panel). In some examples, self-capacitance sensing of touch electrodes can effectively detect the locations of one or more objects (e.g., fingers) hovering over and/or touching the touch sensor panels. Therefore, arranging diamond-shaped electrodes to perform both mutual capacitance and self-capacitance sensing in a hybrid touch sensor panel can improve the touch sensing performance of the touch sense panel system. Moreover, using the same diamond-shaped touch electrodes to perform both mutual capacitance sensing and self-capacitance sensing can reduce the number of electrodes and corresponding traces. Arranging diamond-shaped electrodes on a touch sensor panel can also improve optical uniformity because of how closely the electrodes can be arranged.

Figure 5A:
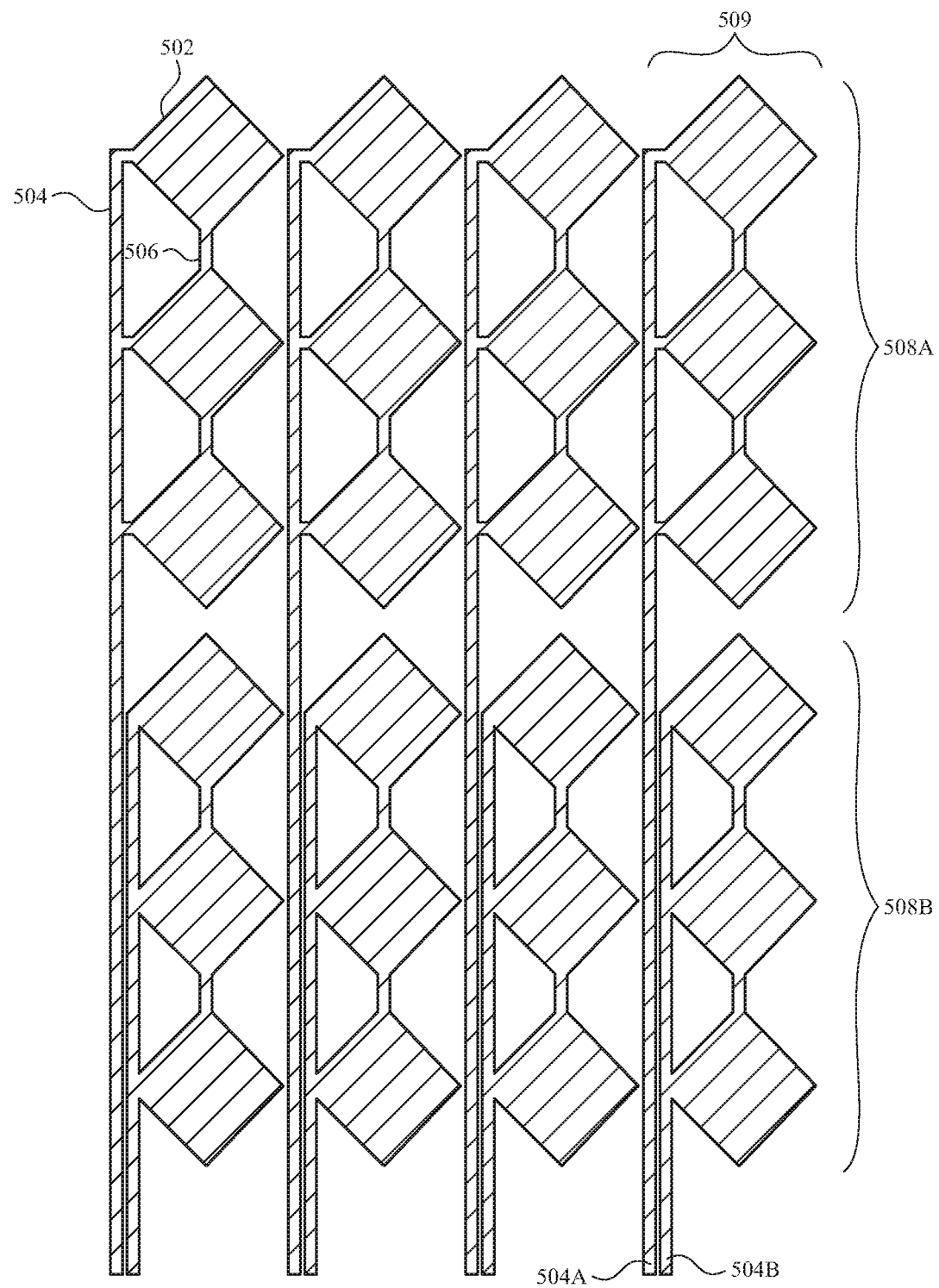
FIGS. 5A-5C illustrate an exemplary touch sensor panel configuration according to examples of the disclosure.
Figure 5B:
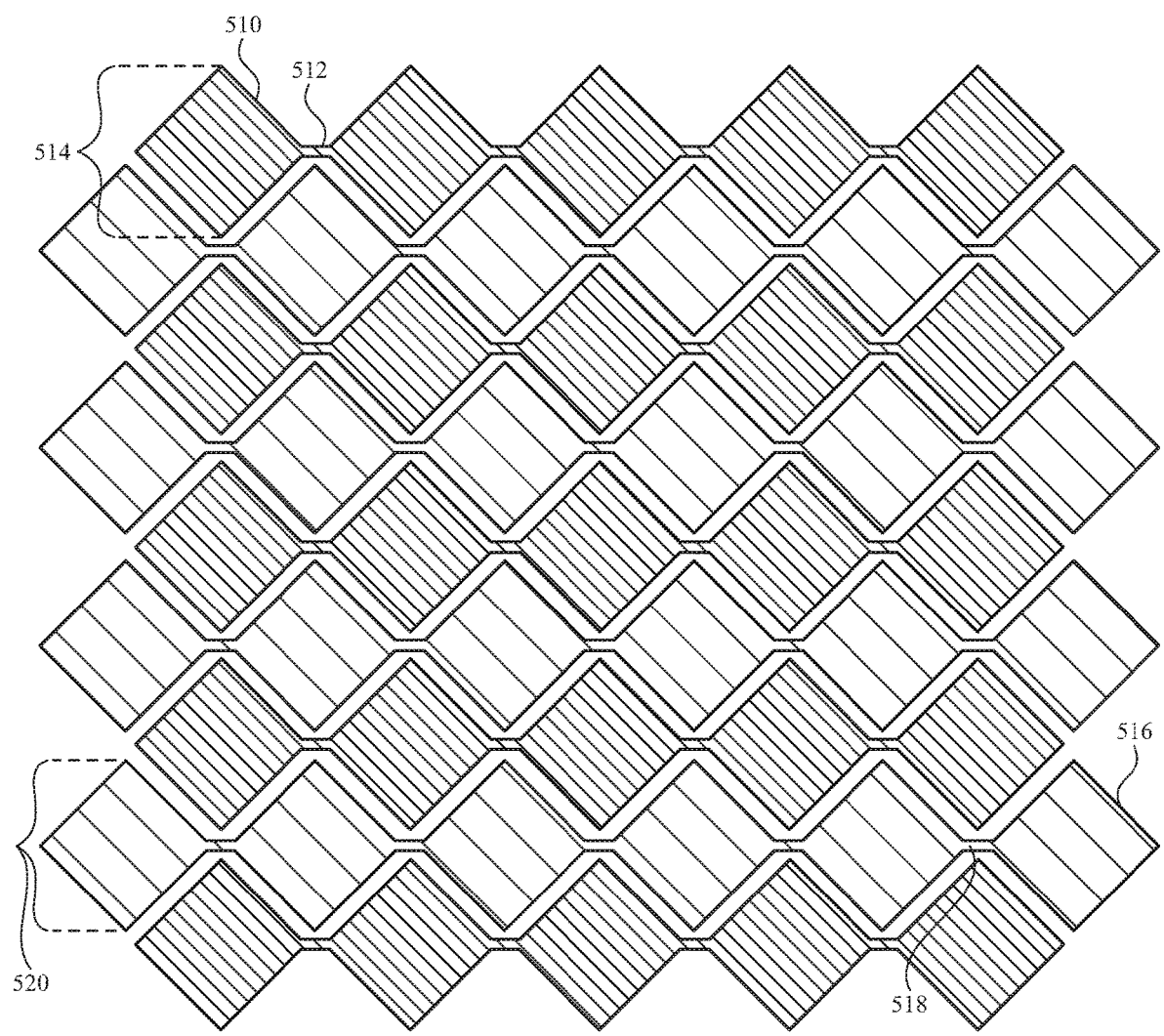
Figure 5C:
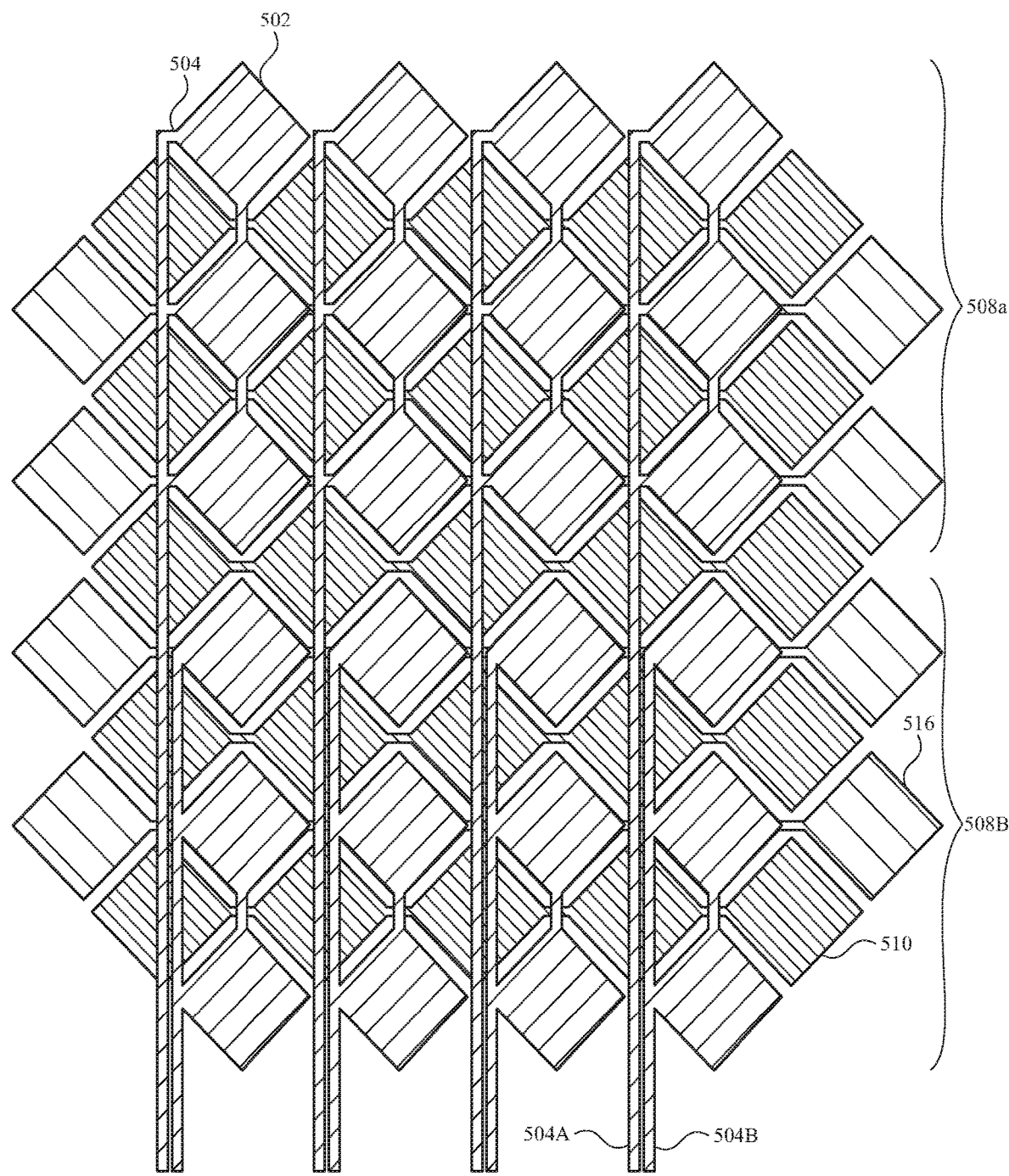

FIGS. 5A-5C illustrate an exemplary touch sensor panel configuration according to examples of the disclosure. It should be noted that FIGS. 5A-5C can reflect the physical layout of electrodes 502, 510, and 516 and their corresponding traces (e.g., the actual physical placement of the various electrodes in the touch sensor panel stackup), or the logical layout of 502, 510, 516, and their corresponding traces (e.g., the physical placement of the various electrodes in the touch sensor panel stackup can differ from that illustrated, but the illustration can reflect the operational areas of those electrodes).

FIG. 5A illustrates collections of diamond-shaped touch electrodes 502 (e.g., subsets of touch electrodes) arranged in a column configuration on a first material layer (e.g., a metal layer) of touch sensor panel 500. For example, FIG. 5A shows touch electrode collection 508A and touch electrode collection 508B arranged vertically to form a column 509. Each touch electrode collection (e.g., each subset) can comprise two or more touch electrodes electrically coupled together (e.g., using appropriate structures 506 (such as ITO traces or bridges) or by simply allowing adjacent touch electrodes 502 to touch or overlap). In some examples, touch electrodes 502 and/or traces 504 can be arranged parallel to a plane of the touch sensor panel. It should be understood that while touch electrode collections 508A and 508B each include three touch electrodes coupled together, collections with fewer (e.g., two, one) or more (e.g., four or more) touch electrodes can be used. In some examples, touch electrode collections 508A and 508B can have a different number of touch electrodes.

Grouping touch electrodes into collections as shown in FIG. 5A can reduce the number of corresponding routing traces needed on the touch sensor panel. For example, FIG. 5A illustrates routing traces 504 coupled to collections of touch electrodes 502 and routed down to touch sensing circuitry (not illustrated). In some examples, routing traces 504 can be separated from other touch electrodes and their corresponding traces arranged on the same or different layers. For example, the routing trace 504A can be electrically coupled to each of the touch electrodes that form collection 508A without touching trace 504B or any of the touch electrodes that form collection 508B. In some examples, each of touch electrodes 502 that form collection 508A and/or 508B can be the same size (or substantially the same size) and/or the same shape (or substantially the same shape). In this way, the sensitivity to touch at each touch electrode (or collection of touch electrodes) can be the same-thus, improving touch-sensing uniformity. For example, the detected capacitance between an object (e.g., a finger) at a given distance from any of touch electrodes 502 can be the same for the same object at the same given distance from each touch electrode 502 (e.g., the touch sensor panel can detect consistent capacitance measurements across each touch electrode 502 at a given distance). In some examples, the size of touch electrodes 502 can vary. For example, the touch electrodes 502 that are closer to the touch sensing circuitry can be smaller than the touch electrodes 502 that are further from the touch sensing circuitry (e.g., touch electrodes 502 forming collection 508B can be smaller than the touch electrodes 502 forming collection 508A, touch electrodes 502 within collection 508A or collection 508B that are closer to the touch sensing circuitry can be smaller than the touch electrodes 502 that are further from the touch sensing circuitry within the same collection) to avoid contact with traces 504. It should be noted that in some examples, traces 504 are not electrically coupled to every single touch electrode as shown in FIG. 5A and can, instead, be electrically coupled to a subset of touch electrodes within a given collection of touch electrodes (e.g., to a single touch electrode in a collection of touch electrodes), further reducing the number of routing traces. It should also be noted that traces 504 can be routed in other directions (e.g., traces 504 can be routed to exit the touch sensor panel 500 on the left side, the right side, the top side, or the bottom side).

As will be discussed in further detail below, touch electrodes 502 can be used to perform mutual capacitance sensing at one point in time and be used to perform self-capacitance sensing at later point in time. In some examples, each of collections 508A and 508B can be separately sensed (e.g., each collection can operate as a "sense electrode" for mutual capacitance sensing or perform self-capacitance sensing) such that a touch or hovering object can be detected at each of collections 508A and 508B separately. It should be should be understood that touch electrodes can operate as sense electrodes if coupled to mutual capacitance sensing circuitry (e.g., sensing circuit 414 of FIG. 4) or perform self-capacitance sensing if coupled to self-capacitance sensing circuitry (e.g., sensing circuit 314 of FIG. 3). For example, one or more electrode collections (e.g., collection 508A) in a given column can be tied to first mutual capacitance sensing circuitry (e.g., sensing circuit 414 of FIG. 4) and one or more other electrode collections (e.g., collection 508B) can be tied to second mutual capacitance sensing circuitry, different than the first mutual capacitance sensing circuitry (e.g., sensing circuit 414 of FIG. 4) when performing mutual capacitance sensing. In this way, column 509 can include multiple sense lines that can each be sensed when performing mutual capacitance sensing. In some examples, each sense electrode in a given column (e.g., collections 508A and 508B in column 509) can be sensed simultaneously or serially. In other examples, each electrode collection forming a column (e.g., collections 508A and 508B) can be sensed as a single sense line when performing mutual capacitance sensing. For example, all of the electrode collections forming each column can be coupled to the same mutual capacitance sense circuitry (e.g., sensing circuit 414 of FIG. 4) such that the column can be sensed as a single sense line. In some examples, each electrode collection can be tied to different self-capacitance sense circuitry (e.g., sensing circuit 314 of FIG. 3) when performing self-capacitance sensing. For example, collection 508A can be tied to first self-capacitance sensing circuitry (e.g., sensing circuit 314 of FIG. 3) and collection 508B can be tied to second self-capacitance sensing circuitry, different than the first self-capacitance sensing circuitry (e.g., sensing circuit 314 of FIG. 3) when performing self-capacitance sensing.

FIG. 5B illustrates diamond-shaped touch electrodes 510 and electrodes 516 arranged in a row configuration on a second material layer (e.g., a metal layer), different than the first material layer of FIG. 5A, of touch sensor panel 500. For example, FIG. 5B shows touch electrodes 510 electrically coupled (e.g., using appropriate structures 512 (such as ITO traces or bridges) or by simply allowing adjacent touch electrodes 510 to touch or overlap) to form rows 514 and electrodes 516 electrically coupled (e.g., using appropriate structures 518 (such as ITO traces or bridges) or by simply allowing adjacent electrodes 516 to touch or overlap) to form rows 520. In some examples, electrodes 516 are arranged within diamond-shaped gaps formed by touch electrodes 510. In some examples, each of electrodes 510 and/or 516 are the same size (or substantially the same size) and/or the same shape (or substantially the same shape). In some examples, each of electrodes 502, 510, and 516 are the same size (or substantially the same size) and/or the same shape (or substantially the same shape). In some examples, electrodes 510 and 516 are different sizes. In some examples, electrodes 510 can be arranged close to but without touching electrodes 516 and their corresponding traces (not shown), and vice versa. In some examples, electrodes 510 and 516 can be arranged close to but without touching structures 512 and 518. In this way, this configuration can improve optical uniformity because of how closely together the electrodes 510 and 516 can be arranged and because each of electrodes 510 and 516 can be the same size (or substantially the same size) and/or the same shape (or substantially the same shape). In some examples, touch electrodes 510 and/or 516 can be arranged parallel to a plane of the touch sensor panel. It should be understood that electrodes 516 can be included in any of the touch senor panels described in this disclosure.

The routing traces that electrically couple electrodes 510 and/or 516 to drive and/or sensing circuitry (such as in FIGS. 3-4) are not shown here for simplicity. In some examples, such routing traces can be coupled to an electrode at the left and/or right end of each row of electrodes 510 and 516 and routed to drive and/or sensing circuitry.

FIG. 5C illustrates touch sensor panel 500 with diamond-shaped touch electrodes 502 arranged in a column configuration on a first material layer (e.g., as described above with reference to FIG. 5A) and diamond-shaped touch electrodes 510 and electrodes 516 arranged in row configurations on a second material layer, under the first material layer (e.g., as disclosed above with reference to FIG. 5B). In some examples, touch electrodes 502 can be arranged over (or substantially over) electrodes 516 (e.g., over the gaps formed by the arrangement of touch electrodes 510), as shown in FIG. 5C-improving optical uniformity because the touch electrodes 502 and 516 are the same size (or substantially the same size) and are the same shape (or substantially the same shape). In some examples, touch electrodes 502 are the same size (or substantially the same size) as electrodes 516. In some examples, touch electrodes 502 are different sizes than electrodes 516 (e.g., touch electrodes 502 can be smaller than electrodes 516, or vice versa). In some examples, electrodes 510 and 516 can be arranged on the first layer and electrodes 502 can be arranged on the second layer, under the first layer.

Operation of the touch sensor panels of FIGS. 5A-5C will now be described. The details of such operation can similarly apply to the touch sensor panels of FIGS. 6-8. In some examples, the exemplary touch sensor panels of FIGS. 5A-5C can operate in a self-capacitance mode and in a mutual capacitance mode. For example, in the self-capacitance mode, touch sensing circuitry can detect a touch and/or a hovering object by detecting changes in the self-capacitance of the individual collections of electrodes 502 (each collection forming a single self-capacitance touch electrode), as described above with reference to FIG. 3, while electrodes 516 can act as guard electrodes (e.g., can be actively driven at a reference voltage (e.g., AC or DC) or can be coupled to ground or any other fixed voltage source) to reduce noise detected at self-capacitance electrodes 502 (e.g., false positives or parasitic coupling), to reduce cross-coupling from grounded objects (e.g., fingers or a grip of the device including the touch sensor panel), and/or reduce capacitance leakage (e.g., from display circuitry below the touch sensor panel). In some examples, touch sensing circuitry can also detect the self-capacitances of electrodes 510—in addition to self-capacitance electrodes 502—to detect a touch and/or a hovering object by detecting changes in the self-capacitances of electrodes 510. In some examples, electrodes 516 can be operated for self-capacitance touch detection in the self-capacitance mode. Thus, in the self-capacitance detection mode, the self-capacitances of only electrodes 502, the self-capacitances of electrodes 502 and/or 510, or the self-capacitances of electrodes 502, 510, and/or 516 can be detected by touch sensing circuitry (e.g., sensing circuitry 314 of FIG. 3).

In some examples, touch sensor panel 500 can be operated in a mutual capacitance sensing mode. For example, in the mutual capacitance mode, each row 514 of electrodes 510 can be driven by a signal (e.g., AC signal) to form drive lines, while touch electrodes 502 can be sensed by touch sensing circuitry (e.g., sensing circuitry 414 of FIG. 4). As described above with reference to FIG. 2, the intersection of drive electrodes/lines and sense electrodes/lines can form mutual capacitance touch nodes. In some examples, electrodes 516 can be coupled to ground or be driven by another reference voltage (e.g., DC or AC) during the mutual capacitance mode while drive electrodes 510 are being driven by a stimulation voltage and sense electrodes 502 are being sensed by touch sensing circuitry (e.g., sensing circuitry 414 of FIG. 4). As described above with reference to FIG. 5A, each collection of electrodes 502 within a given column can be separately sensed or all of the electrodes 502 within the column can be sensed simultaneously such that the collections of electrodes 502 within the column can behave as a single sense electrode/line. In some examples, the mutual capacitance between the drive lines (e.g., formed by electrodes 510 or electrodes 516) and one or more electrodes 502 can be sensed at touch electrode collections in a column serially (e.g., at electrode collection 508A first and at touch electrode collection 508B second, or vice versa) or simultaneously (e.g., at touch electrode collections 508A and 508B simultaneously). In some examples, touch sensing circuitry can be configured to detect changes in the mutual capacitance between the electrodes acting as drive and sense electrodes in a row and column configuration, as described above with references to FIGS. 1-2. In some examples, electrodes 516 can be operated as guard electrodes (e.g., electrodes 516 can be actively driven at a reference voltage (e.g., AC or DC) or can be coupled to ground or any other fixed voltage source) to reduce noise coupled to sense electrodes 502 (e.g., false positives or parasitic coupling). In some examples, touch sensing circuitry can be configured to perform mutual capacitance sensing during a first phase (e.g., the mutual capacitance mode) and self-capacitance sensing during a second phase (e.g., the self-capacitance mode), where the first and second phases do not overlap in time, though in other examples, the first and second phases can partially or fully overlap in time. In some examples, the durations of the first phase and the second phase can be fixed (e.g., be predetermined). In some examples, the durations of the first phase and the second phase can be dynamic.

Figure 6A:
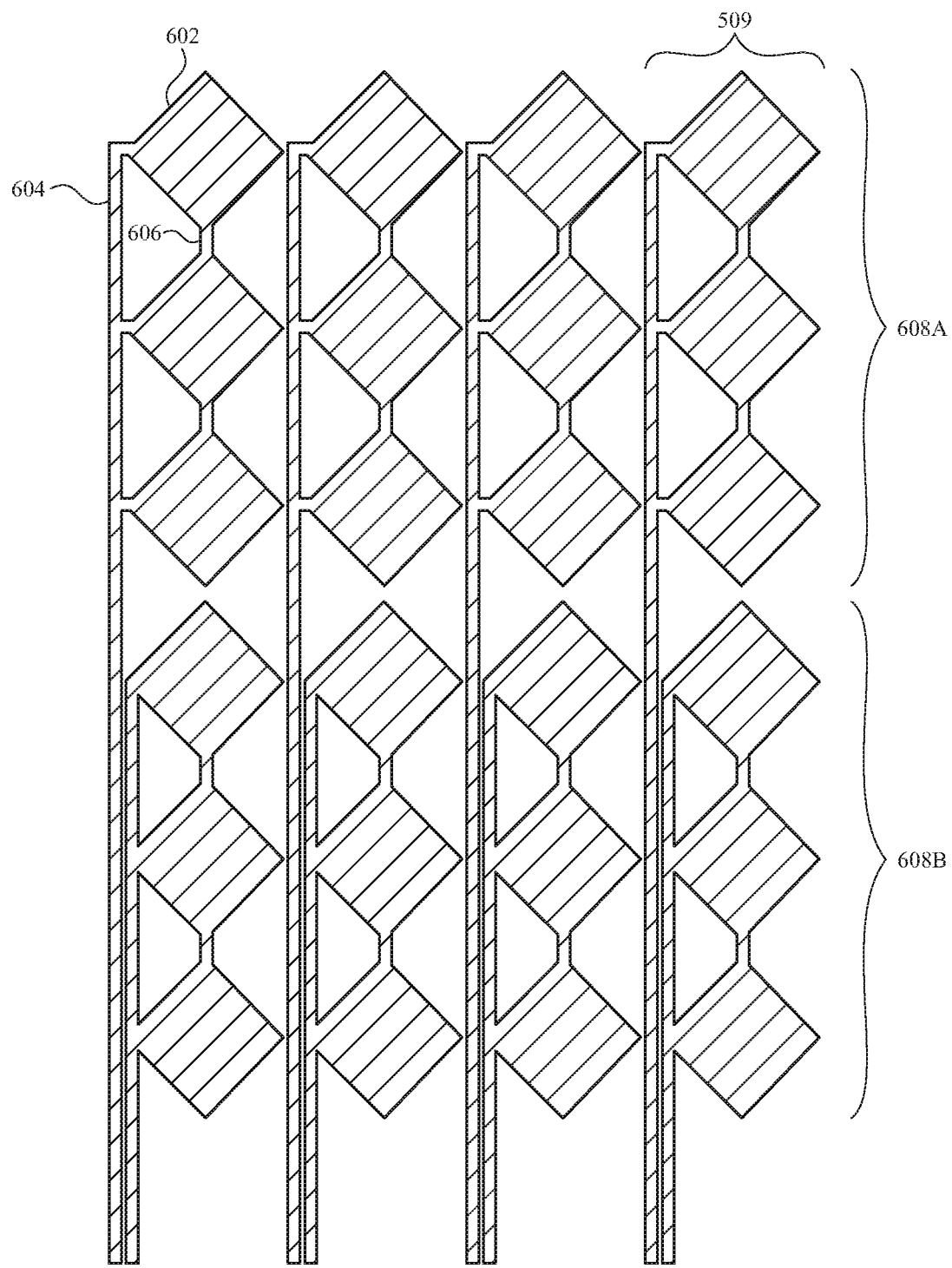
FIGS. 6A-6C illustrate a second exemplary touch sensor panel configuration according to examples of the disclosure.
Figure 6B:
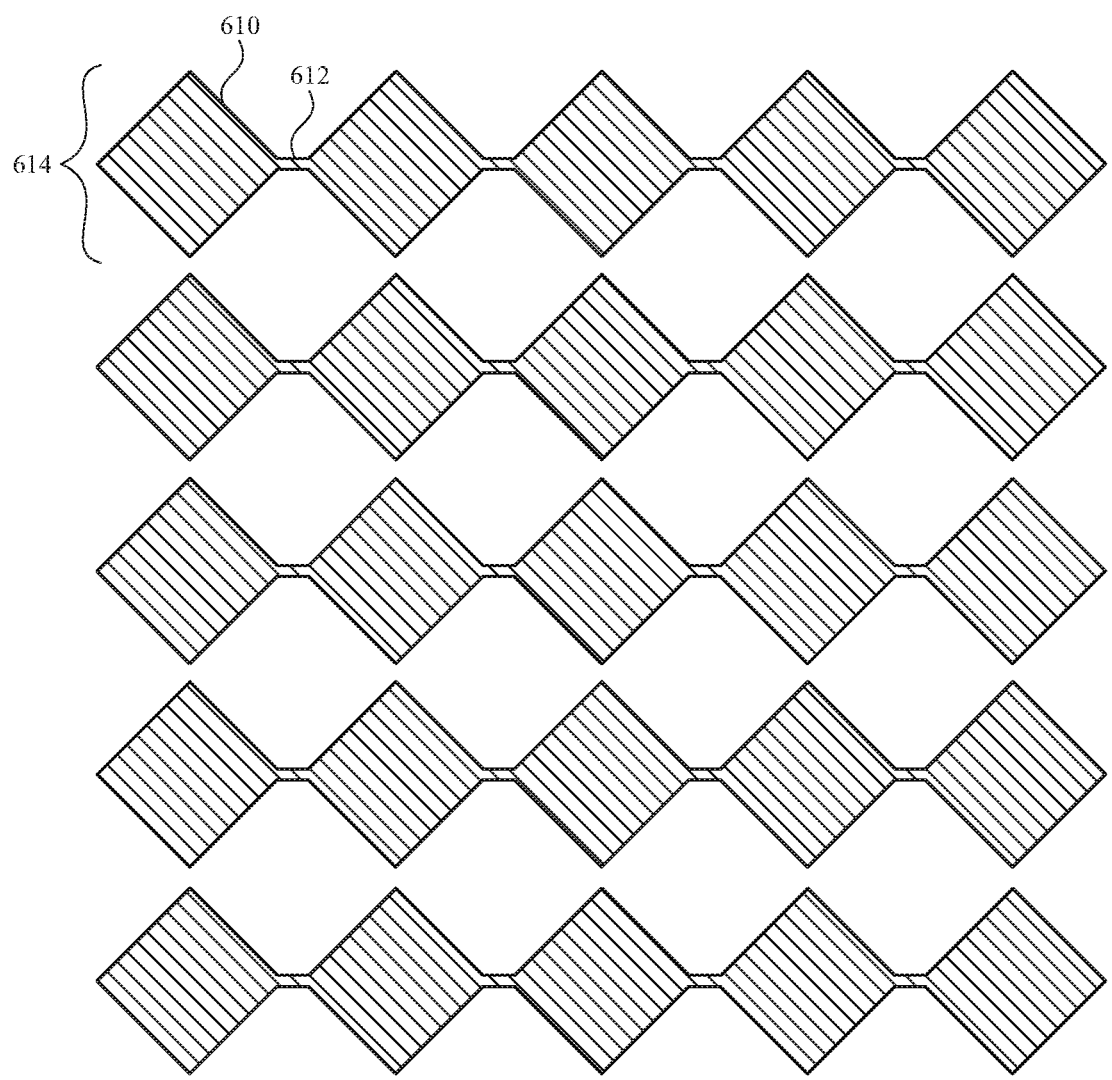
Figure 6C:
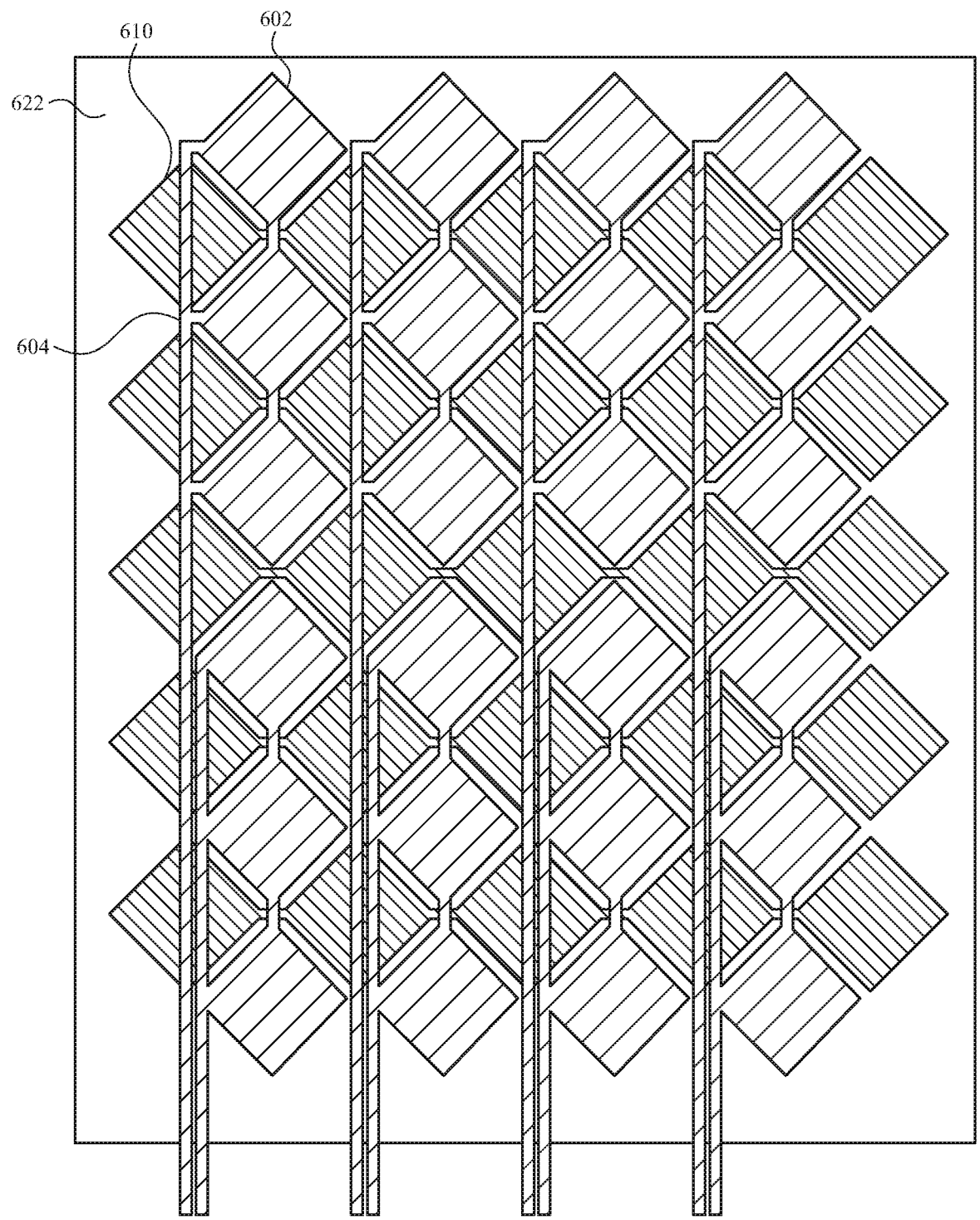

FIGS. 6A-6C illustrate a second exemplary touch sensor panel configuration according to examples of the disclosure. FIG. 6A illustrates a column configuration of diamond-shaped touch electrodes 602 and routing traces 604 on a first material layer of touch sensor panel 600 that is identical to the configuration of diamond-shaped touch electrodes 502 and routing traces 504 shown in FIG. 5A. Therefore, the details of FIG. 6A can be the same as those of FIG. 5A.

FIG. 6B illustrates a row configuration of diamond-shaped touch electrodes 610 that is similar to the configuration of diamond shaped electrodes 510 shown in FIG. 5B, but without electrodes corresponding to electrodes 516 of FIG. 5B (e.g., without electrodes arranged in gaps 603 formed by touch electrodes 610). The remaining details of FIG. 6B can be the same as those of FIG. 5B.

FIG. 6C illustrates touch sensor panel 600 with diamond-shaped touch electrodes 602 arranged in a column configuration on a first material layer (e.g., as described above with reference to FIGS. 5A and 6A) and diamond-shaped touch electrodes 610 arranged in row configurations on a second material layer, under the first material layer (e.g., as disclosed above with reference to FIGS. 5B and 6B). In some examples, touch electrodes 602 can be arranged over (or substantially over) areas under which no electrodes 610 are arranged, as shown in FIG. 6C (e.g., over the areas in which electrodes 516 would have been arranged in FIG. 5C). In some examples, electrodes 610 can be arranged on the first layer and electrodes 602 can be arranged on the second layer, under the first layer. Touch electrodes 602 and 610 can be used to perform self-capacitance sensing and/or mutual capacitance sensing (e.g., as described above with reference to touch electrodes 502 and 510 of FIGS. 5A-5C).

In some examples, any of the touch sensor panels described herein, including those described with reference to FIGS. 5A-5C and 7A-8C, can include a guard layer that can be a conductive sheet in a layer of the touch sensor panel different than where electrodes of the touch sensor panel are arranged (e.g., in a layer of the touch sensor panel below the layers that include touch electrodes), and which can be used to facilitate touch sensing on the touch sensor panel by being coupled to a guard signal (e.g., an AC or DC reference voltage, ground, or any other fixed voltage source). For example, FIG. 6C illustrates a touch electrode configuration that includes guard layer 622 according to examples of the disclosure. Specifically, touch electrode configuration 600 shows guard layer 622 disposed on a third material layer, touch electrodes 610 arranged in a row configuration disposed on a second material layer (e.g., above the third layer, such as described above with reference to touch electrodes 510 and 610 of FIGS. 5B-6B), and touch electrodes 602 arranged in a row configuration on a first material layer (e.g., above the second layer, such as described above with reference to touch electrodes 502 and 602 of FIGS. 5A-6A). As described above with reference to FIG. 5C, touch electrodes 602 and 610 can be configured to operate in a mutual touch sensing mode or a self-capacitance touch sensing mode at different points in time. For example, at one point in time, touch electrodes 610 can be operated as drive electrodes and touch electrodes 602 can be operated as sense electrodes (or vice versa) for mutual capacitance touch sensing (e.g., as described above with reference to FIGS. 4 and 5C), and/or touch electrodes 602 and/or 610 can be operated as self-capacitance electrodes for self-capacitance touch sensing (e.g., as described above with reference to FIGS. 3 and 5C). At another point in time, touch electrodes 602 can be operated as drive electrodes and touch electrodes 610 can be operated as sense electrodes (or vice versa) for mutual capacitance touch sensing (e.g., as described above with reference to FIG. 4), and/or touch electrodes 602 and/or 610 can be operated as self-capacitance electrodes for self-capacitance touch sensing (e.g., as described above with reference to FIGS. 3 and 5C). In some examples, guard electrode 622 can comprise a sheet of conductive material that can span the entire area of touch sensor panel 600 (e.g., a continuous layer of conductive material in the third material layer below touch electrodes 602 and 610 and potentially above display circuitry that is below the touch sensor panel 600). In some examples, guard electrode 622 can be operated as a guard (e.g., can be actively driven at a reference voltage (e.g., AC or DC) or can be coupled to ground or any other fixed voltage source) to reduce noise coupled to touch electrodes 602 and/or 610 (e.g., false positives or parasitic coupling) during touch sensing. In some examples, guard electrode 622 is operated as a guard when performing self-capacitance and/or mutual capacitance sensing. In some examples, guard electrode 622 is floating when performing mutual capacitance sensing, but is operated as a guard during self-capacitance sensing. It should be understood that guard electrode 622 can be included in any of the touch senor panels described in this disclosure.

Figure 7A:
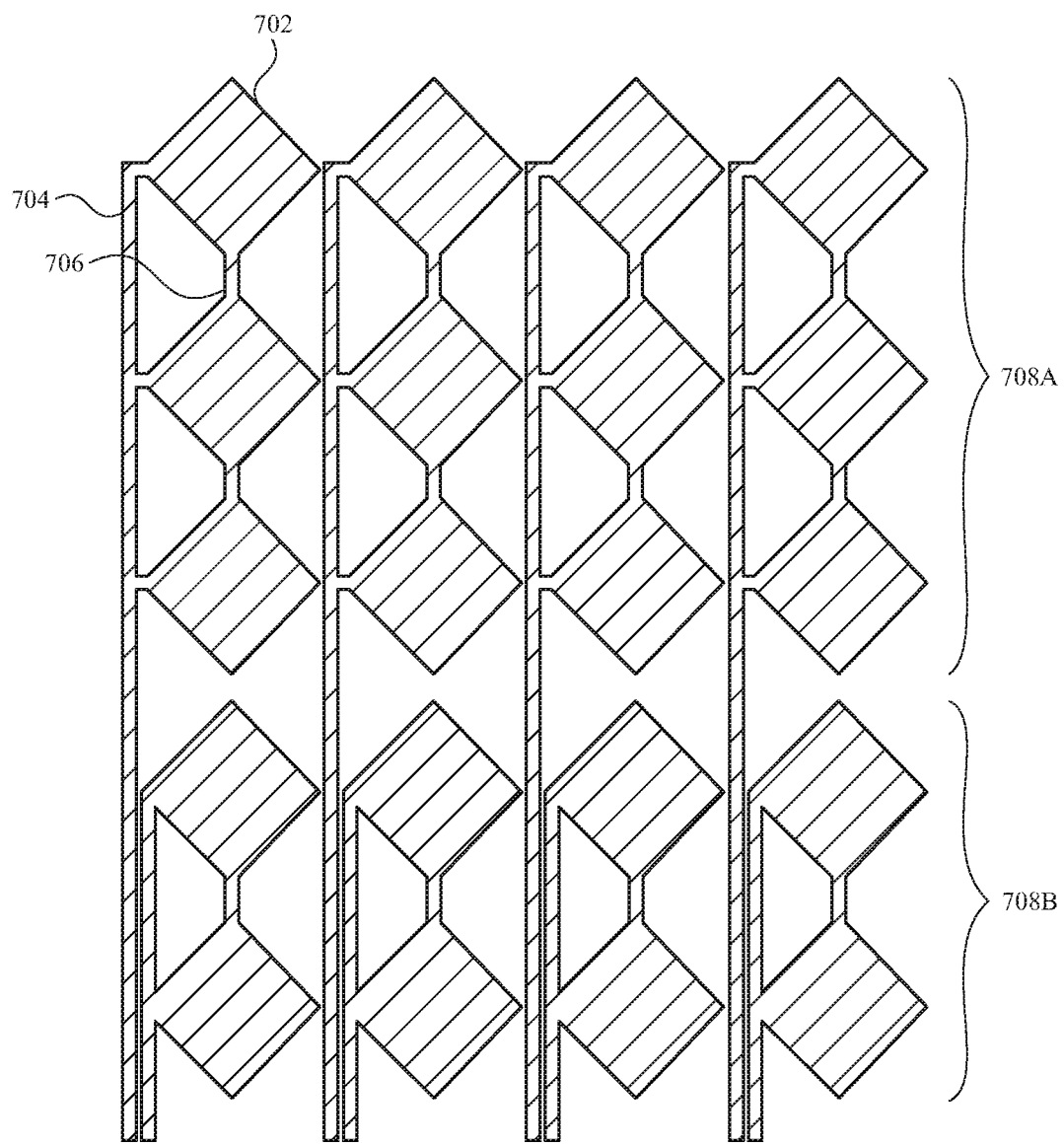
FIGS. 7A-7C illustrate a third exemplary touch sensor panel configuration according to examples of the disclosure.
Figure 7B:
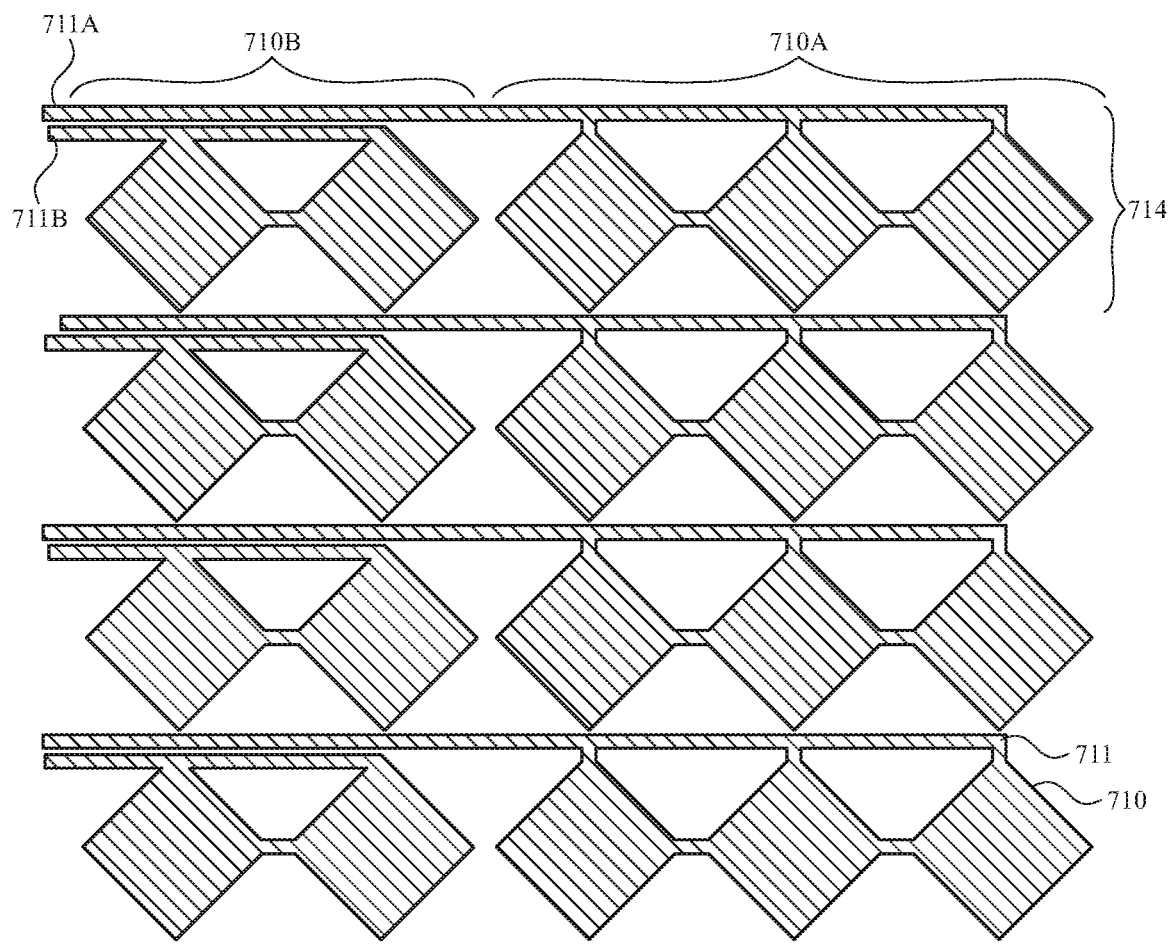
Figure 7C:
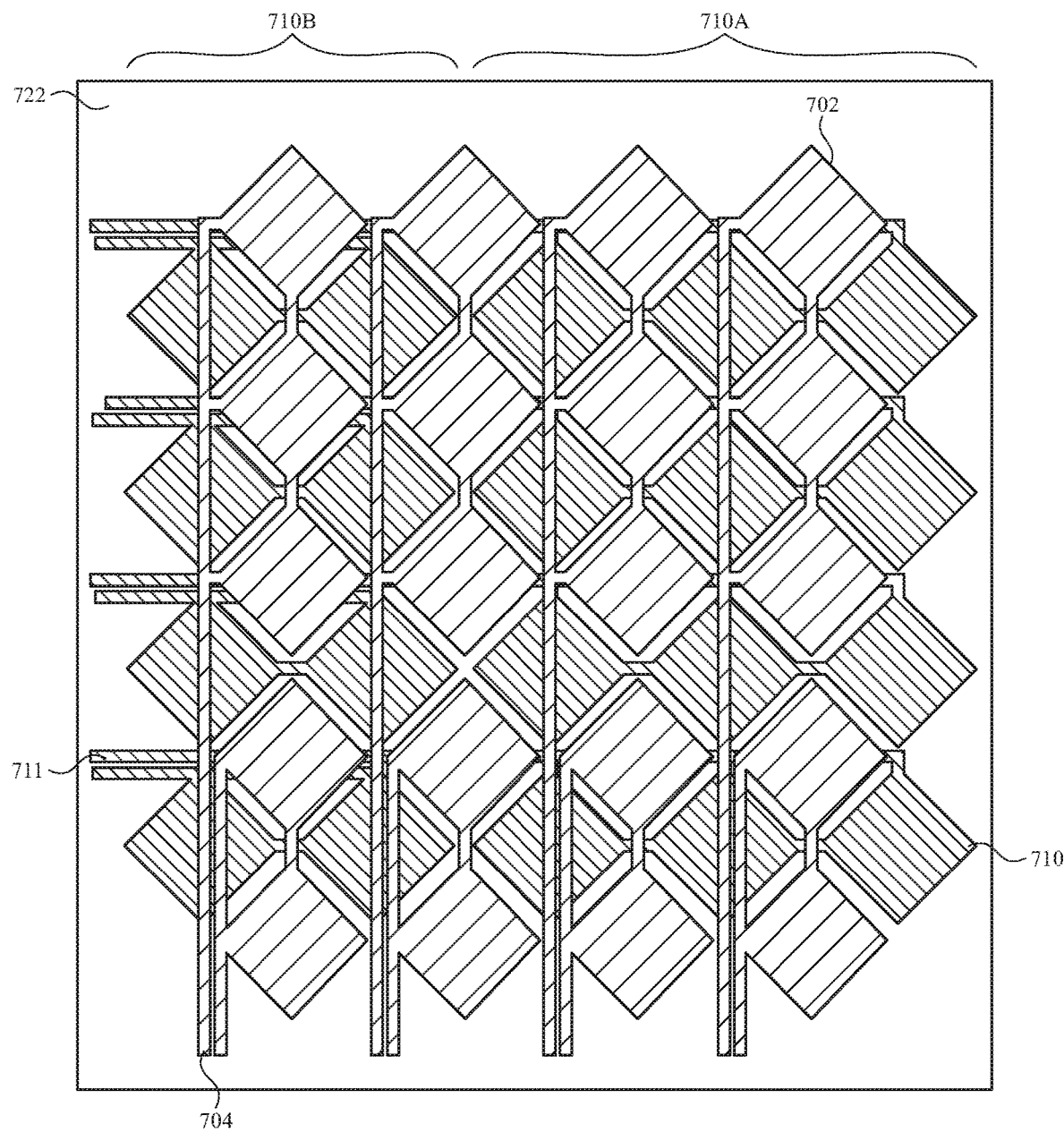

FIGS. 7A-7C illustrate a third exemplary touch sensor panel configuration according to examples of the disclosure. FIG. 7A illustrates a column configuration of diamond-shaped touch electrodes 702 and routing traces 704 on a first material layer of touch sensor panel 700 that is similar to the configuration of diamond-shaped touch electrodes 502 and 602 and routing traces 504 and 604 shown in FIGS. 5A and 6A, respectively. While FIG. 7A shows collection 708B formed by two touch electrodes 702, it should be understood that collections with fewer (e.g., one) or more (e.g., three, four) touch electrodes can be formed. Therefore, the details of FIG. 7A can be the same as those of FIGS. 5A and 6A.

FIG. 7B illustrates a row configuration of diamond-shaped touch electrodes 710 that is similar to the configuration of diamond shaped electrodes 510 and 610 shown in FIG. 6B, but with routing traces 711 coupled to collections of electrodes (e.g., routing traces 711A coupled to collection 710A and routing traces 711B coupled to collection 710B). FIG. 7B also shows collections of touch electrodes within each row. For example, row 714 can be formed by collections 710A and 710B. In some examples, collections 710A and 710B can be coupled to ground or be driven by the same drive voltage (e.g., AC) during the mutual capacitance mode such that row 714 operates as a single "drive line". In some examples, collections 710A and 710B can be coupled to different drive voltages (e.g., AC) during mutual capacitance sensing. For example, during the mutual capacitance mode, collection 710A can be driven by a first drive voltage (e.g., AC) and collection 710 can be driven a second drive voltage (e.g., AC), different than the first drive voltage. In this way, effectively distinct mutual capacitance touch panels can be formed across the touch sensor panel. In some examples, during the self-capacitance mode, changes in the self-capacitance of each collection (e.g., collection 710A and 710B) can be detected by different sensing circuitry (e.g., sensing circuitry 314 of FIG. 3). In other examples, changes in the self-capacitance of two or more collections (e.g., collection 710A and 710B) can be detected by the same sensing circuitry (e.g., sensing circuitry 314 of FIG. 3) (e.g., an entire row of collections operating as a single self-capacitance electrode). The remaining details of FIG. 7B can be the same as those of FIG. 6B.

In some examples, routing traces 711 can be coupled to collections of touch electrodes 710 and routed to touch sensing circuitry, as illustrated in FIG. 7B. In some examples, routing traces 711 can be separated from other touch electrodes and their corresponding traces arranged on the same or different layers. For example, the routing trace 711A can be electrically coupled to each of the touch electrodes that form collection 710A without touching trace 711B or any of the touch electrodes that form collection 710B. In some examples, each of touch electrodes 710 that form collection 710A and/or 710B can be the same size (or substantially the same size) and can have the same shape (or substantially the same shape). In some examples, the size of touch electrodes 710 can vary. For example, the touch electrodes 710 that are closer to the touch sensing circuitry can be smaller than the touch electrodes 710 that are further from the touch sensing circuitry (e.g., touch electrodes 710 forming collection 710A can be smaller than the touch electrodes 710 forming collection 710B, and touch electrodes 710 within collection 710A or collection 710B that are closer to the touch sensing circuitry can be smaller than the touch electrodes 710 that are further from the touch sensing circuitry within the same collection) to avoid contact with traces 711. It should be noted that in some examples, traces 711 are not electrically coupled to every single touch electrodes as shown in FIG. 7B and can, instead, be electrically coupled to a subset of touch electrodes within a given collection of touch electrodes (e.g., to a single touch electrode in a collection of touch electrodes)—further reducing the number of routing traces. It should also be noted that traces 711 can be routed in other directions (e.g., traces 504 can be routed to exit the touch sensor panel 500 on the left side, the right side, the top side, or the bottom side). While touch electrode collections 710A and 710B include three and two touch electrodes coupled together, respectively, collections with any number of touch electrodes can be used (e.g., one, four). In some examples, touch electrode collections 710A and 710B can have the same number of touch electrodes.

FIG. 7C illustrates touch sensor panel 700 with diamond-shaped touch electrodes 702 arranged in a column configuration on a first material layer (e.g., as described above with reference to FIGS. 5A, 6A, and 7A), diamond-shaped touch electrodes 710 and routing traces arranged in row configurations on a second material layer, under the first material layer (e.g., as described above with reference to FIG. 7B), and guard layer 722 disposed on a third material layer, under the second material layer (e.g., as described above with reference to FIG. 6C). In some examples, touch electrodes 702 can be arranged over (or substantially over) areas under which no electrodes 710 are arranged, as shown in FIG. 7C (e.g., over the areas in which electrodes 516 would have been arranged in FIG. 5C). In some examples, electrodes 710 can be arranged on the first layer and electrodes 702 can be around on the second layer, under the first layer. Touch electrodes 702 and 710 can be used to perform self-capacitance sensing and/or mutual capacitance sensing (e.g., as described above with reference to touch electrodes 502 and 510 of FIGS. 5A-5C). It should be understood that the electrode collections in the second layer (e.g., collections 710A and 710B) are separately addressable during self-capacitance (e.g., when each collection is coupled to different sensing circuitry (e.g., sensing circuitry 314 of FIG. 3)) and/or mutual capacitance sensing (e.g., when driven at a different drive voltage as described above with reference to FIG. 7B).

Figure 8A:
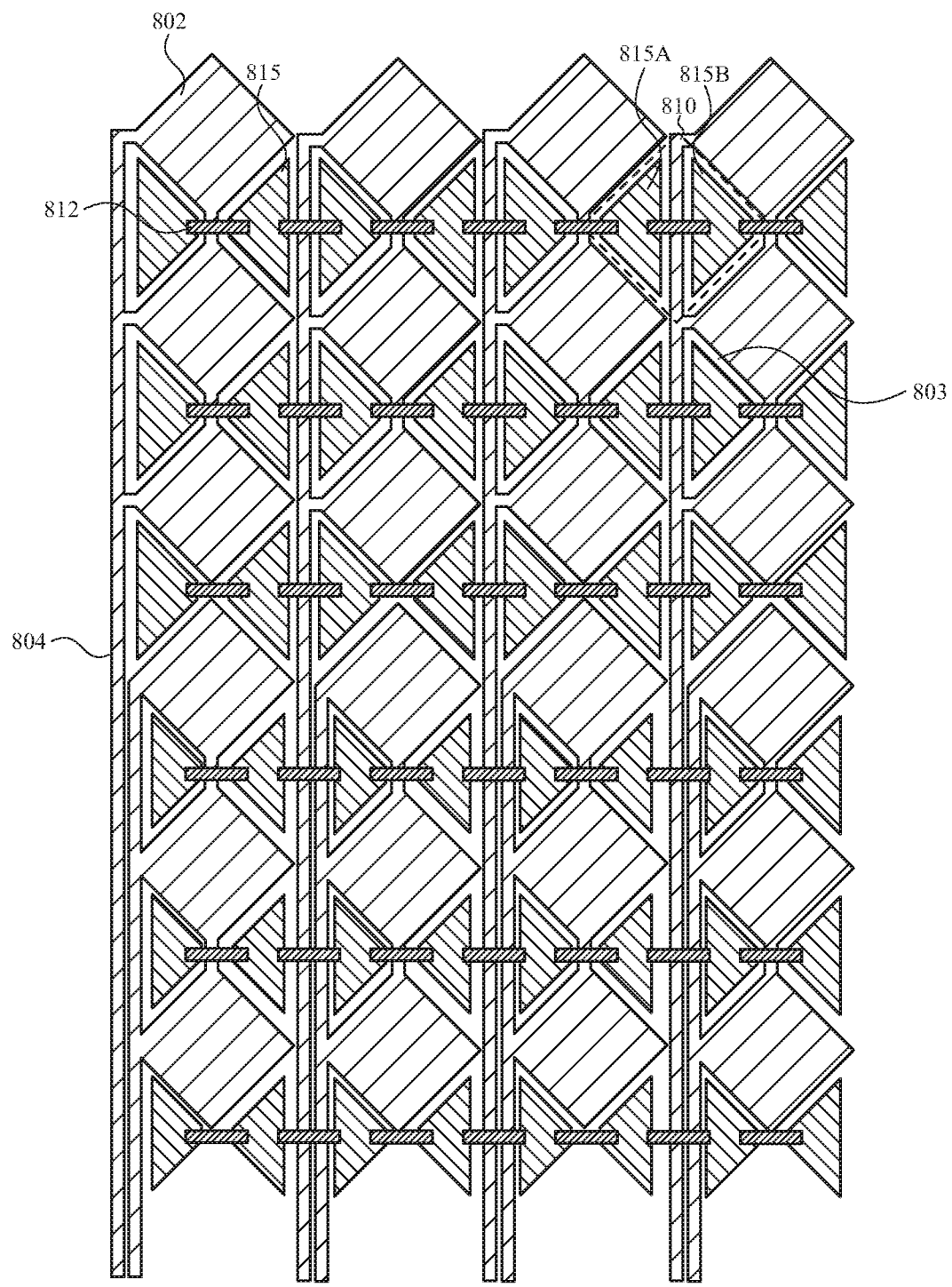
FIGS. 8A-8C illustrate a fourth exemplary touch sensor panel configuration according to examples of the disclosure.
Figure 8B:
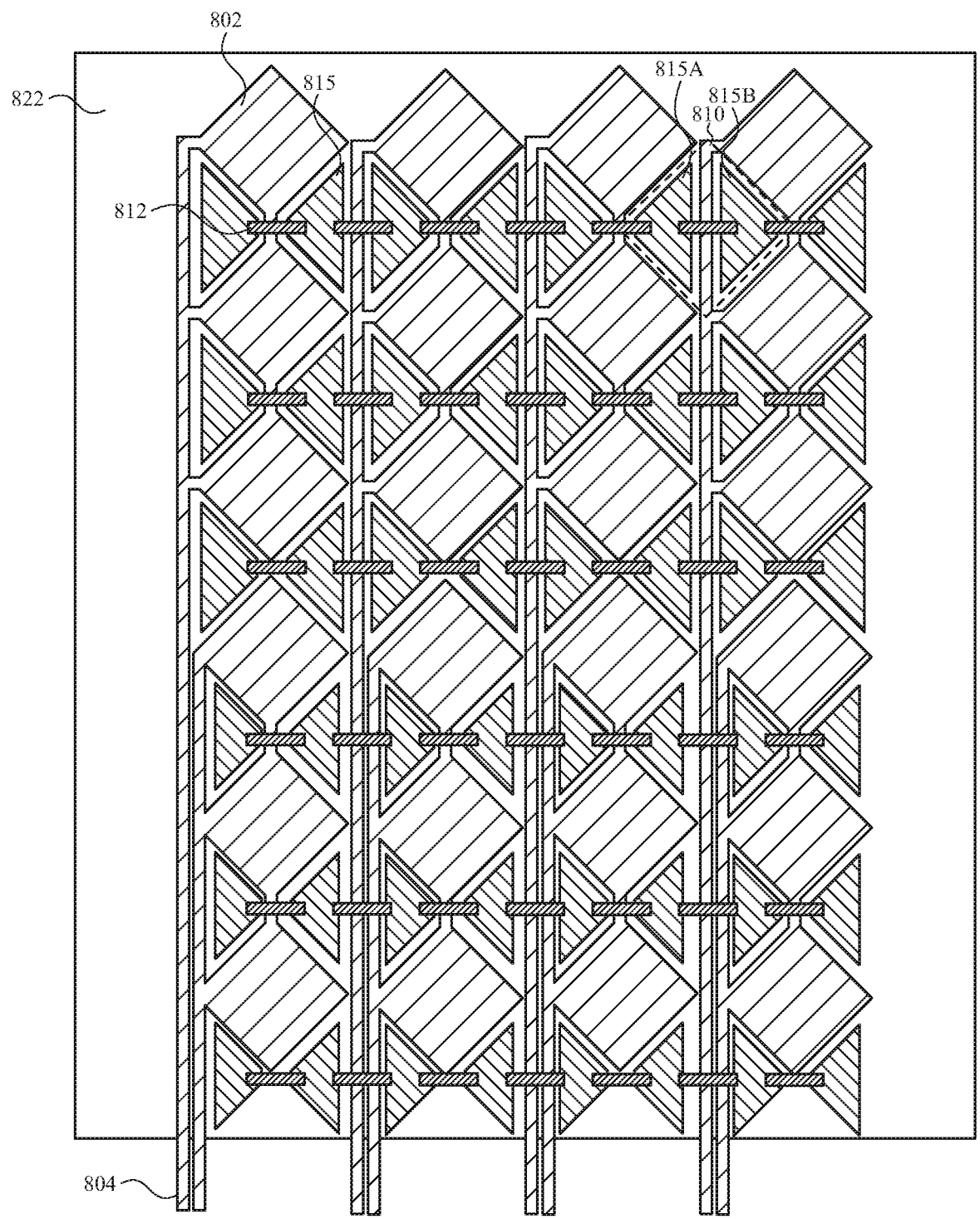
Figure 8C:
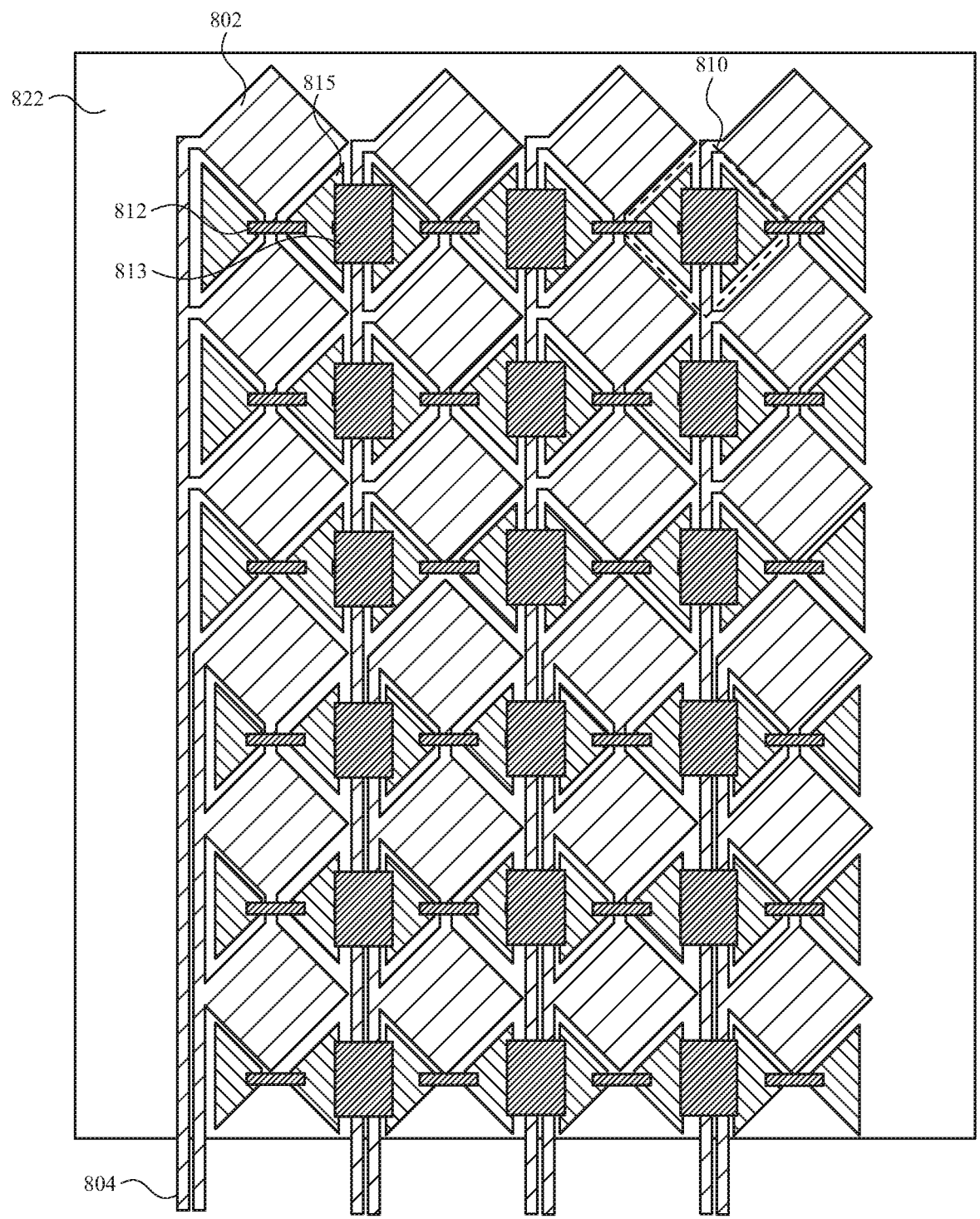

FIGS. 8A-8C illustrate a third exemplary touch sensor panel configuration according to examples of the disclosure. FIG. 8A illustrates a column configuration of diamond-shaped touch electrodes 802 and routing traces 804 on a first material layer of touch sensor panel 800 that is identical to the configuration of diamond-shaped touch electrodes 502 and 602 and routing traces 504 and 604 shown in FIGS. 5A and 6A, respectively (e.g., collections 802 of touch electrodes arranged into columns with routing traces 804 being routed from top to bottom), but with triangular-shaped touch electrodes 815 arranged in a row configuration within the first material layer as well. In some examples, touch electrodes 802 and touch electrodes 815 can be arranged parallel to the same plane of the touch sensor panel. In some examples, two or more triangular-shaped touch electrodes 815 can be electrically coupled together by bridges 812 (e.g., ITO bridges) to form rows. In some examples, triangular-shaped touch electrodes 815 are arranged on the left and right of routing traces 804 and in between touch electrodes 802 (e.g., within gaps 803 formed by touch electrodes 802 and routing traces 804) with bridges 812 going over routing traces 804. It should be understood that triangular-shaped touch electrodes 815 can be arranged close to but without touching touch electrodes 802 and routing traces 804. In some examples, the triangular-shaped touch electrodes are all the same size (e.g., all have the same surface area). It should be noted that two adjacent triangular-shaped touch electrodes (e.g., touch electrodes 815A and 815B) and their connecting bridge form a diamond shaped touch electrode 810 that is the same (or substantially the same) size and/or shape as the diamond-shaped electrodes described above (e.g., electrodes 510, 610, and 710 as described with reference to FIGS. 5-7). In some examples, triangular-shaped touch electrodes 815 have different sizes (e.g., have different surface areas). For example, the triangular-shaped touch electrodes 815 with a higher number of routing traces routed between them (e.g., the touch electrodes 815 near the bottom of FIG. 8A) can be smaller than the triangular-shaped electrodes with fewer routing traces routed between them (e.g., the touch electrodes 815 near the top of FIG. 8A). The routing traces for touch electrodes 815 (e.g., the traces that electrically couple the touch electrodes to drive and/or sensing circuitry such as in FIGS. 3-4) are not shown here for simplicity. In some examples, such routing traces can be coupled to an electrode at the left and/or right end of each row of touch electrodes 815 and routed to drive and/or sensing circuitry.

FIG. 8B illustrates touch sensor panel 800 with diamond-shaped touch electrodes 802 (and corresponding routing traces 804) arranged in a column configuration, and triangular-shaped touch electrodes 815 arranged in a row configuration on a first material layer (e.g., as described above with reference to FIG. 8A) and guard layer 822 disposed on a second material layer, under the first material layer (e.g., as described above with reference to FIGS. 6C and 7C). Touch electrodes 802 and touch electrodes 815 can be used to perform self-capacitance sensing and/or mutual capacitance sensing (e.g., as described above with reference to touch electrodes 502 and 510 of FIGS. 5A-5C where touch electrodes 802 can correspond to touch electrodes 502 and touch electrodes 815 can correspond to touch electrodes 510) while guard layer 822 is driven as a guard to reduce noise coupled to touch electrodes 802, touch electrodes 815, traces 804, and/or bridges 812 (e.g., as described above with reference to FIGS. 5C, 6C, and 7C).

FIG. 8C illustrates the same touch sensor panel 800 of FIG. 8B, but with wider bridges 813 (e.g., at least ⅓ the height of the triangle electrodes, at least ½ the height of the triangle electrodes, at least ⅔ the height of the triangle electrodes, at least ¾ the height of the triangle electrodes) connecting the adjacent triangular-shaped electrodes 815 with routing traces 804 between them (e.g., triangular-shaped electrodes 815A and 815B). In this way, bridges 813 can be used to shield traces 804 running under them to reduce noise (e.g., false positives or parasitic coupling), to reduce cross-coupling from grounded objects (e.g., fingers or a grip of the device including the touch sensor panel), and/or reduce capacitance leakage (e.g., from surrounding circuitry). Shield of traces 804 from above by bridges 813 can be especially important during self-capacitance sensing of electrodes 802, because self-capacitance measurements can be especially susceptible to parasitic capacitances (e.g., due to coupling of objects with traces 804 rather than or in addition to electrodes 802). Thus, in some examples, during self-capacitance sensing of electrodes 802, electrodes 815A and 815B can be driven at a guard signal (e.g., an AC or DC reference voltage, ground, or any other fixed voltage source); though in some examples, during self-capacitance sensing of electrodes 802, 815A and 815B can alternatively be sensed for self-capacitance as well, or left floating.

Figure 9A:
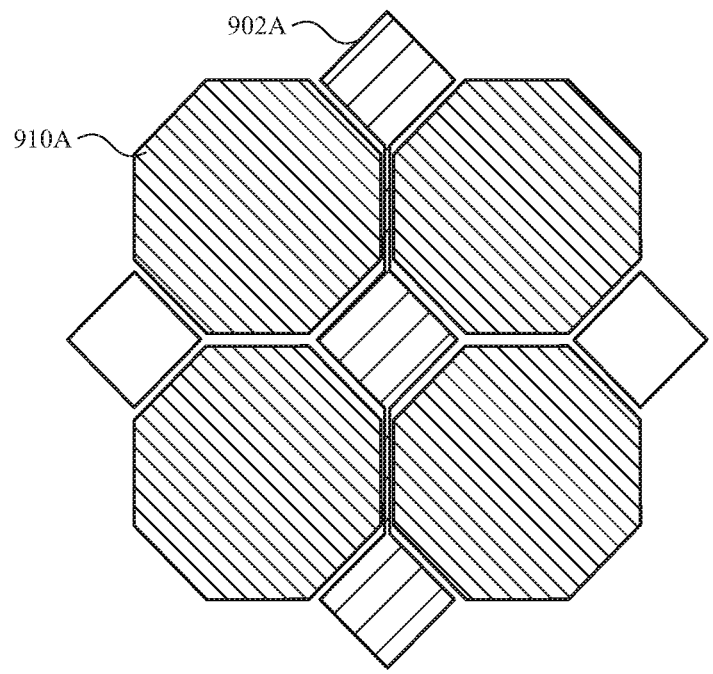
FIGS. 9A-9B illustrate additional exemplary touch electrodes according to examples of the disclosure.
Figure 9B:
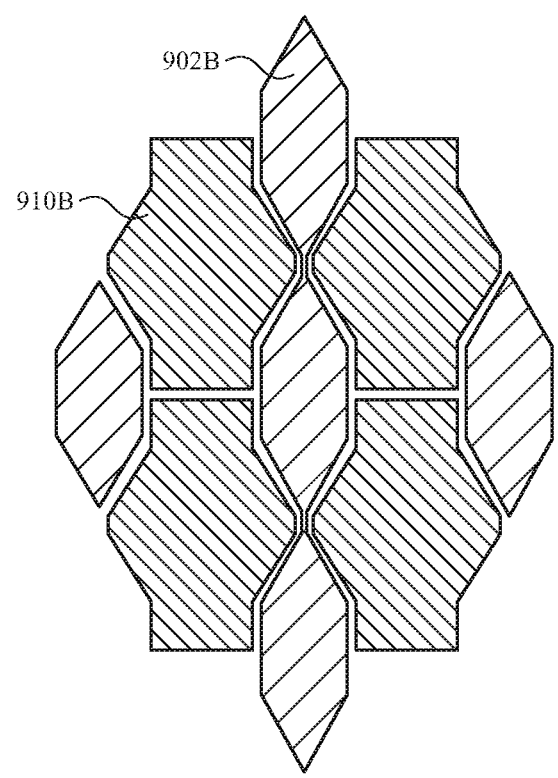

FIGS. 9A-9B illustrate additional exemplary touch electrodes according to examples of the disclosure. As described above, the touch electrodes described in this disclosure can vary in shape and in size, for example such that drive electrodes and sense electrodes are asymmetrical in size and/or shape. For example, FIG. 9A illustrates diamond-shaped touch electrodes 902A (which can correspond to touch electrodes 502 in FIGS. 5A and 5C, touch electrodes 602 in FIGS. 6A and 6C, touch electrodes 702 in FIGS. 7A and 7C, and/or touch electrodes 802 in FIGS. 8A-8C) disposed on a first material layer (e.g., a metal layer) and octagon-shaped touch electrodes 910A (which can correspond to touch electrodes 510 in FIGS. 5B-5C, touch electrodes 610 in FIGS. 6B-6C, touch electrodes 710 in FIGS. 7B-7C, and/or touch electrodes 810 in FIGS. 8A-8C) disposed on a second material layer (e.g., the same or different metal layer). In some examples, touch electrodes 902A can overlap (or partially overlap) touch electrodes 910A. It should be understood that touch electrodes in this disclosure need not be polygons and can take any shape. For example, the shape of touch electrodes 902A and/or 910A can include curved lines. While FIG. 9A illustrates touch electrodes 902A with a smaller surface area than touch electrodes 910A, in some examples, touch electrodes 902A can have a larger surface area than touch electrodes 910A. In some examples, the surface area of each touch electrode 902A and/or 910A can vary. It should be understood that any of the touch panel configurations disclosed in this disclosure can include touch node electrodes 902A and/or 910A, as shown in FIG. 9A. For example, touch electrodes 902A can be used instead of touch electrodes 502 in FIGS. 5A and 5C, instead of touch electrodes 602 in FIGS. 6A and 6C, instead of touch electrodes 702 in FIGS. 7A and 7C, and/or instead of touch electrodes 802 in FIGS. 8A-8C; touch electrodes 910A can be used instead of touch electrodes 510 in FIGS. 5B-5C, instead of touch electrodes 610 in FIGS. 6B-6C, and/or instead of touch electrodes 710 in FIGS. 7B-7C; and/or touch electrodes 810 in FIGS. 8A-8C can take the shape of touch electrodes 910A.

As another example, FIG. 9B illustrates hexagon-shaped touch electrodes 902B (which can correspond to touch electrodes 502 in FIGS. 5A and 5C, touch electrodes 602 in FIGS. 6A and 6C, touch electrodes 702 in FIGS. 7A and 7C, and/or touch electrodes 802 in FIGS. 8A-8C) disposed on a first material layer (e.g., a metal layer) and touch electrodes 910B (which can correspond to touch electrodes 510 in FIGS. 5B-5C, touch electrodes 610 in FIGS. 6B-6C, touch electrodes 710 in FIGS. 7B-7C, and/or touch electrodes 810 in FIGS. 8A-8C) disposed on a second material layer (e.g., the same or different metal layer) having a shape that contours around (or substantially around) the hexagon shape of touch electrodes 902B. In some examples, touch electrodes 902B can overlap (or partially overlap) touch electrodes 910B. It should be understood that touch electrodes in this disclosure need not be polygons and can take any shape. For example, the shape of touch electrodes 902B and/or 910B can include curved lines. While FIG. 9B illustrates touch electrodes 902B with a smaller surface area than touch electrodes 910B, in some examples, touch electrodes 902B can have a larger surface area than touch electrodes 910B. In some examples, the surface area of each touch electrode 902B and/or 910B can vary. It should be understood that any of the touch panel configurations disclosed in this disclosure can include touch node electrodes 902B and/or 910B, as shown in FIG. 9B. For example, touch electrodes 902B can be used instead of touch electrodes 502 in FIGS. 5A and 5C, instead of touch electrodes 602 in FIGS. 6A and 6C, instead of touch electrodes 702 in FIGS. 7A and 7C, and/or instead of touch electrodes 802 in FIGS. 8A-8C; touch electrodes 910B can be used instead of touch electrodes 510 in FIGS. 5B-5C, instead of touch electrodes 610 in FIGS. 6B-6C, and/or instead of touch electrodes 710 in FIGS. 7B-7C; and/or touch electrodes 810 in FIGS. 8A-8C can take the shape of touch electrodes 910B.

Thus, the examples of the disclosure provide various touch sensor panel configurations that include diamond-shaped touch electrodes that combine mutual capacitance and self-capacitance sensing of diamond-shaped touch electrodes, which can help can improve the touch sensing performance of the system while improving optical uniformity, reducing the number of electrodes and corresponding routing traces, and can help to decrease and optimize cost and facilitate system integration.

Therefore, according to the above, some examples of the disclosure are directed to a touch sensor panel comprising: a first set of touch electrodes, wherein the first set of touch electrodes are configured to operate as drive electrodes; and a second set of touch electrodes, wherein the second set of touch electrodes are configured to operate as sense electrodes, wherein: the first set of touch electrodes are disposed within gaps between the second set of touch electrodes, and a given row or column of touch electrodes of the second set of touch electrodes includes a plurality of subsets of touch electrodes that are separately addressable by touch sensing circuitry. Additionally or alternatively to one or more of the examples disclosed above, in some examples, the second set of electrodes are arranged on a first layer of the touch sensor panel, and the first set of electrodes are arranged on a second layer, below the first layer. Additionally or alternatively to one or more of the examples disclosed above, in some examples, a third set of touch electrodes configured to operate as guard electrodes, wherein the third set of touch electrodes are disposed within gaps between the second set of touch electrodes on the second layer. Additionally or alternatively to one or more of the examples disclosed above, in some examples, the third set of electrodes on the second layer are aligned with the second set of electrodes on the first layer. Additionally or alternatively to one or more of the examples disclosed above, in some examples, a guard layer disposed on a third layer, below the second layer. Additionally or alternatively to one or more of the examples disclosed above, in some examples, the second set of electrodes are configured to operate as mutual capacitance sense electrodes during a first period of time and as self-capacitance electrodes during a second period of time. Additionally or alternatively to one or more of the examples disclosed above, in some examples, the first and second sets of electrodes are arranged on a first layer of the touch sensor panel. Additionally or alternatively to one or more of the examples disclosed above, in some examples, each of the first set of electrodes comprises two triangular shaped electrodes coupled together via a bridge. Additionally or alternatively to one or more of the examples disclosed above, in some examples, the bridges are disposed over one or more routing traces corresponding to the second set of electrodes. Additionally or alternatively to one or more of the examples disclosed above, in some examples, the bridges are configured to guard the routing traces corresponding to the second set of electrodes from noise. Additionally or alternatively to one or more of the examples disclosed above, in some examples, a given row or column of the first set of electrodes includes a plurality of subsets of touch electrodes separately addressable by touch circuitry. Additionally or alternatively to one or more of the examples disclosed above, in some examples, the plurality of subsets of touch electrodes are separately addressable to drive all of the first electrodes in the row or column with the same drive signal during a first period of time, and separately addressable to individually sense the self-capacitance of each of the plurality of subsets of touch electrodes during a second period of time. Additionally or alternatively to one or more of the examples disclosed above, in some examples, the plurality of subsets of touch electrodes of a given row or column of touch electrodes of the second set of touch electrodes are configured to be: sensed by the same sense circuitry during a first period of time; and individually sensed by different sense circuitry during a second period of time. Additionally or alternatively to one or more of the examples disclosed above, in some examples, the first set of touch electrodes have diamond shapes, the second set of touch electrodes have diamond shapes, and the first set of touch electrodes are disposed within diamond-shaped gaps between the second set of touch electrodes.

Additionally or alternatively, in some examples, the touch electrodes described above are programmed to operate in the respective manner described above. Additionally or alternatively, in some examples, the touch electrodes described above are capable of operating in the respective manner described above.

Some examples of the disclosure are directed to a method for operating a method for operating a touch sensor panel, the method comprising: operating a first set of touch electrodes as drive electrodes; and operating a second set of touch electrodes as sense electrodes, wherein: the first set of touch electrodes are disposed within gaps between the second set of touch electrodes, and a given row or column of touch electrodes of the second set of touch electrodes includes a plurality of subsets of touch electrodes that are separately addressable by touch sensing circuitry. Additionally or alternatively to one or more of the examples disclosed above, in some examples, the second set of electrodes are arranged on a first layer of the touch sensor panel, and the first set of electrodes are arranged on a second layer, below the first layer. Additionally or alternatively to one or more of the examples disclosed above, in some examples, operating a third set of touch electrodes as guard electrodes, wherein the third set of touch electrodes are disposed within gaps between the second set of touch electrodes on the second layer. Additionally or alternatively to one or more of the examples disclosed above, in some examples, a given row or column of the first set of electrodes includes a plurality of subsets of touch electrodes separately addressable by touch circuitry. Additionally or alternatively to one or more of the examples disclosed above, in some examples, the first set of touch electrodes have diamond shapes, the second set of touch electrodes have diamond shapes, and the first set of touch electrodes are disposed within diamond-shaped gaps between the second set of touch electrodes.

Some examples of the disclosure are directed to a method for operating a method of fabricating a touch sensor panel comprising: forming a first set of touch electrodes configured to operate as drive electrodes; and forming a second set of touch electrodes configured to operate as sense electrodes, wherein: the first set of touch electrodes are disposed within gaps between the second set of touch electrodes, and a given row or column of touch electrodes of the second set of touch electrodes includes a plurality of subsets of touch electrodes that are separately addressable by touch sensing circuitry. Additionally or alternatively to one or more of the examples disclosed above, in some examples, the second set of electrodes are arranged on a first layer of the touch sensor panel, and the first set of electrodes are arranged on a second layer, below the first layer. Additionally or alternatively to one or more of the examples disclosed above, in some examples, forming a third set of touch electrodes configured to operate as guard electrodes, wherein the third set of touch electrodes are disposed within gaps between the second set of touch electrodes on the second layer. Additionally or alternatively to one or more of the examples disclosed above, in some examples, a given row or column of the first set of electrodes includes a plurality of subsets of touch electrodes separately addressable by touch circuitry. Additionally or alternatively to one or more of the examples disclosed above, in some examples, the first set of touch electrodes are formed to have diamond shapes, the second set of touch electrodes are formed to have diamond shapes, and the first set of touch electrodes are disposed within diamond-shaped gaps between the second set of touch electrodes.

Additionally or alternatively, in some examples, the touch electrodes described above are programmed to operate in the respective manner described above. Additionally or alternatively, in some examples, the touch electrodes described above are capable of operating in the respective manner described above.

It is understood that any element described above as being "configured to" perform respective functions or steps or operate in a respective manner can, in some examples, be programmed to or be capable of performing those respective functions or steps or operate in the respective manner. Similarly, any element described above as being "capable of" performing respective functions or steps or operate in a respective manner can, in some examples, be programmed to or be configured to perform those respective functions or steps or operate in the respective manner. Similarly, any element described above as being "programmed to" perform respective functions or steps or operate in a respective manner can, in some examples, be configured to or be capable of performing those respective functions or steps or operate in the respective manner.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
   a first set of touch electrodes, wherein the first set of touch electrodes are configured to operate as drive electrodes; and
   a second set of touch electrodes disposed in a first layer of the touch sensor panel, wherein the second set of touch electrodes are configured to operate as sense electrodes; and
   a plurality of guard electrodes disposed in a second layer of the touch sensor panel different from the first layer;
   wherein:
      the first set of touch electrodes are disposed in areas corresponding to gaps in the first layer of the touch sensor panel between the second set of touch electrodes,
      the second set of touch electrodes disposed in the first layer overlap at least partially the plurality of guard electrodes disposed in the second layer, and
      a given row or column of touch electrodes of the second set of touch electrodes includes a plurality of subsets of touch electrodes that are separately addressable by touch sensing circuitry.

2. The touch sensor panel of claim 1, wherein the first set of touch electrodes are disposed in the second layer below the first layer.

3. The touch sensor panel of claim 2, wherein the plurality of guard electrodes is disposed in areas corresponding to gaps in the second layer of the touch sensor panel between the first set of touch electrodes disposed in the second layer.

4. The touch sensor panel of claim 3, wherein the plurality of guard electrodes disposed in the second layer is aligned with the second set of touch electrodes disposed in the first layer.

5. The touch sensor panel of claim 1, wherein the first set of touch electrodes are disposed in a third layer between the first layer and the second layer of the touch sensor panel.

6. The touch sensor panel of claim 1, wherein the second set of touch electrodes are configured to operate as mutual capacitance sense electrodes during a first period of time and as self-capacitance electrodes during a second period of time.

7. The touch sensor panel of claim 1, wherein the first set of touch electrodes and the second set of touch electrodes are disposed in the first layer of the touch sensor panel.

8. The touch sensor panel of claim 7, wherein each of the first set of touch electrodes comprises two triangular-shaped electrodes coupled together via a bridge.

9. The touch sensor panel of claim 8, wherein the bridges are disposed over one or more routing traces corresponding to the second set of touch electrodes.

10. The touch sensor panel of claim 9, wherein the bridges are configured to guard the routing traces corresponding to the second set of touch electrodes from noise.

11. The touch sensor panel of claim 1, wherein a given row or column of the first set of touch electrodes includes a plurality of subsets of touch electrodes separately addressable by touch circuitry.

12. The touch sensor panel of claim 11, wherein the plurality of subsets of touch electrodes are separately addressable to drive all of the plurality of subsets of touch electrodes in the given row or column with the same drive signal during a first period of time, and separately addressable to individually sense the self-capacitance of each of the plurality of subsets of touch electrodes during a second period of time.

13. The touch sensor panel of claim 1, wherein the plurality of subsets of touch electrodes of a given row or column of touch electrodes of the second set of touch electrodes are configured to be:
   sensed by the same sense circuitry during a first period of time; and
   individually sensed by different sense circuitry during a second period of time.

14. The touch sensor panel of claim 1, wherein the first set of touch electrodes have diamond shapes, the second set of touch electrodes have diamond shapes, and the first set of touch electrodes are disposed within diamond-shaped gaps between the second set of touch electrodes.

15. A method for operating a touch sensor panel including a first set of touch electrodes, a second set of touch electrodes disposed in a first layer of the touch sensor panel, and a plurality of guard electrodes disposed in a second layer of the touch sensor panel different from the first layer, the method comprising:
   operating the first set of touch electrodes as drive electrodes; and
   operating the second set of touch electrodes as sense electrodes,
   wherein:
      the first set of touch electrodes are disposed in areas corresponding to gaps in the first layer of the touch sensor panel between the second set of touch electrodes,
      the second set of touch electrodes disposed in the first layer overlap at least partially the plurality of guard electrodes disposed in the second layer, and
      a given row or column of touch electrodes of the second set of touch electrodes includes a plurality of subsets of touch electrodes that are separately addressable by touch sensing circuitry.

16. The method of claim 15, wherein the first set of touch electrodes are disposed in the second layer below the first layer.

17. The method of claim 16, wherein the plurality of guard electrodes is disposed in areas corresponding to gaps in the second layer of the touch sensor panel between the first set of touch electrodes disposed in the second layer.

18. The method of claim 15, wherein a given row or column of the first set of touch electrodes includes a plurality of subsets of touch electrodes separately addressable by touch circuitry.

19. The method of claim 15, wherein the first set of touch electrodes have diamond shapes, the second set of touch electrodes have diamond shapes, and the first set of touch electrodes are disposed within diamond-shaped gaps between the second set of touch electrodes.

20. An electronic device comprising:
a display;
a touch sensor panel including a first layer and a second layer and including a first plurality of electrodes, a second plurality of electrodes and third plurality of electrodes; and
a touch controller configured to perform a touch sensing operation using the touch sensor panel;
wherein:
 the second plurality of electrodes is disposed in the first layer and is configured to operate as sense electrodes for the touch sensing operation;
 the third plurality of electrodes is disposed in the second layer and is configured to operate as guard electrodes for the touch sensing operation;
 the first plurality of electrodes is disposed in areas corresponding to gaps in the first layer of the touch sensor panel between the second plurality of electrodes,
 the second plurality of electrodes overlap at least partially the plurality of third electrodes disposed in the second layer, and
 the touch controller is configured to sense, for a given column of the touch sensor panel, a first capacitance for a first sense electrode including a first interconnected plurality of the second plurality of electrodes and a second capacitance for a second sense electrode including a second interconnected plurality of the second plurality of electrodes different from the first interconnected plurality.

21. The electronic device of claim 20, wherein:
the touch controller is configurable to operate the touch sensor panel in a mutual capacitance mode or a self-capacitance mode;
in the self-capacitance mode, the touch controller is configured to sense, for the given column of the touch sensor panel, a first self-capacitance for the first sense electrode including the first interconnected plurality of the second plurality of electrodes and a second self-capacitance for the second sense electrode including the second interconnected plurality of the second plurality of electrodes; and
in the mutual capacitance mode, the touch controller is configured to sense, for the given column of the touch sensor panel, one or more mutual capacitances between one or more drive electrodes formed from the first plurality of electrodes and a sense electrode including the first interconnected plurality of the second plurality of electrodes and the second interconnected plurality of the second plurality of electrodes.

22. The electronic device of claim 21, the electronic device further comprising:
 a plurality of routing traces between the touch sensor panel and the touch controller, the plurality of routing traces including a first routing trace and a second routing trace;
 wherein in the self-capacitance mode, the first routing trace couples to the first sense electrode to a first amplifier of the touch controller and the second routing trace couples the second sense electrode to a second amplifier of the touch controller different from the first amplifier; and
 wherein in the mutual capacitance mode, the first routing trace and the second routing trace couple the sense electrode to the first amplifier.

23. The electronic device of claim 20, wherein first plurality of electrodes is disposed in the second layer below the first layer and the third plurality of electrodes is disposed in areas corresponding to gaps in the second layer between the first plurality of electrodes.

24. The electronic device of claim 20, wherein the second plurality of electrodes is disposed on the first layer and a plurality of bridges are used to interconnect groups of the first plurality of electrodes or groups of the second plurality of electrodes to form the sense electrodes or drive electrodes.

* * * * *